(12) United States Patent
Rezvani

(10) Patent No.: US 7,356,049 B1
(45) Date of Patent: Apr. 8, 2008

(54) METHOD AND APPARATUS FOR OPTIMIZATION OF CHANNEL CAPACITY IN MULTI-LINE COMMUNICATION SYSTEMS USING SPECTRUM MANAGEMENT TECHNIQUES

(75) Inventor: Behrooz Rezvani, San Ramon, CA (US)

(73) Assignee: Ikanos Communication, Inc., Fremont, CA (US)

( * ) Notice: Subject to any disclaimer, the term of this patent is extended or adjusted under 35 U.S.C. 154(b) by 980 days.

(21) Appl. No.: 10/334,623

(22) Filed: Dec. 30, 2002

Related U.S. Application Data

(60) Provisional application No. 60/346,344, filed on Dec. 28, 2001, provisional application No. 60/353,432, filed on Jan. 31, 2002, provisional application No. 60/395,635, filed on Jul. 12, 2002, provisional application No. 60/401,642, filed on Aug. 6, 2002, provisional application No. 60/430,248, filed on Dec. 2, 2002.

(51) Int. Cl.
*H04J 1/00* (2006.01)
*H04L 5/16* (2006.01)
(52) U.S. Cl. .................... 370/484; 370/493; 375/222
(58) Field of Classification Search ............ 370/352, 370/465, 484, 493–495; 375/222
See application file for complete search history.

(56) References Cited

U.S. PATENT DOCUMENTS

| | | | |
|---|---|---|---|
| 6,393,052 B2 * | 5/2002 | Sadjadpour et al. ........ | 375/222 |
| 6,445,773 B1 * | 9/2002 | Liang et al. ............... | 379/1.04 |
| 6,452,907 B1 * | 9/2002 | Levin ........................ | 370/252 |
| 6,473,438 B1 | 10/2002 | Cioffi et al. | |
| 6,631,120 B1 * | 10/2003 | Milbrandt .................. | 370/252 |
| 6,711,207 B1 * | 3/2004 | Amrany et al. ............. | 375/222 |
| 6,970,501 B1 * | 11/2005 | Bremer et al. .............. | 375/222 |
| 7,133,419 B1 * | 11/2006 | Hendrichs et al. .......... | 370/468 |
| 2002/0090008 A1 | 7/2002 | Cioffi et al. | |

(Continued)

FOREIGN PATENT DOCUMENTS

EP      0763295 B1     10/2002

(Continued)

*Primary Examiner*—Chau Nguyen
*Assistant Examiner*—Marcus R Smith
(74) *Attorney, Agent, or Firm*—IP Creators; Charles C Cary

(57) ABSTRACT

The present invention advantageously provides a method and apparatus for optimization of channel capacity in multi-line multi-tone communications such as X-DSL among subscriber lines which are bundled with one another. In an embodiment of the invention an apparatus for optimizing channel capacity of multi-tone communications effected by opposing sets of modems coupled to one another by a plurality of subscriber lines is disclosed. The apparatus includes a spectrum manager coupled to at least one of the opposing sets of modems. The spectrum manager includes: a profiler, a demand module and an optimizer. The profiler obtains from the at least one of the opposing sets of modems the spectral characteristics of each of the plurality of subscriber lines. The demand module determines for each of the plurality of subscriber lines the subscriber demand profile. The optimizer defines target parameters for at least one of bit loading, and power spectral density (PSD) for selected tones of the multi-tone communications based on the spectral characteristics from the profile module and the demand profiles from the demand module and downloads the target parameters to the at least one of the opposing sets of modems.

7 Claims, 11 Drawing Sheets

U.S. PATENT DOCUMENTS

| | | |
|---|---|---|
| 2002/0093989 A1 | 7/2002 | Cioffi et al. |
| 2002/0122437 A1 | 9/2002 | Cioffi et al. |
| 2002/0131455 A1 | 9/2002 | Cioffi et al. |
| 2002/0136397 A1 | 9/2002 | Zeng et al. |

FOREIGN PATENT DOCUMENTS

| | | |
|---|---|---|
| WO | WO02/100008 A1 | 12/2002 |

* cited by examiner

60 Pair Bundle

FIG. 3A   Loop Length Differences
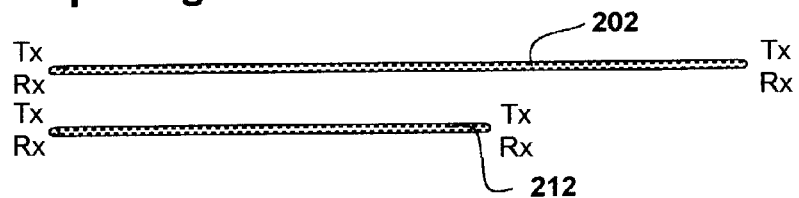
FIG. 3B
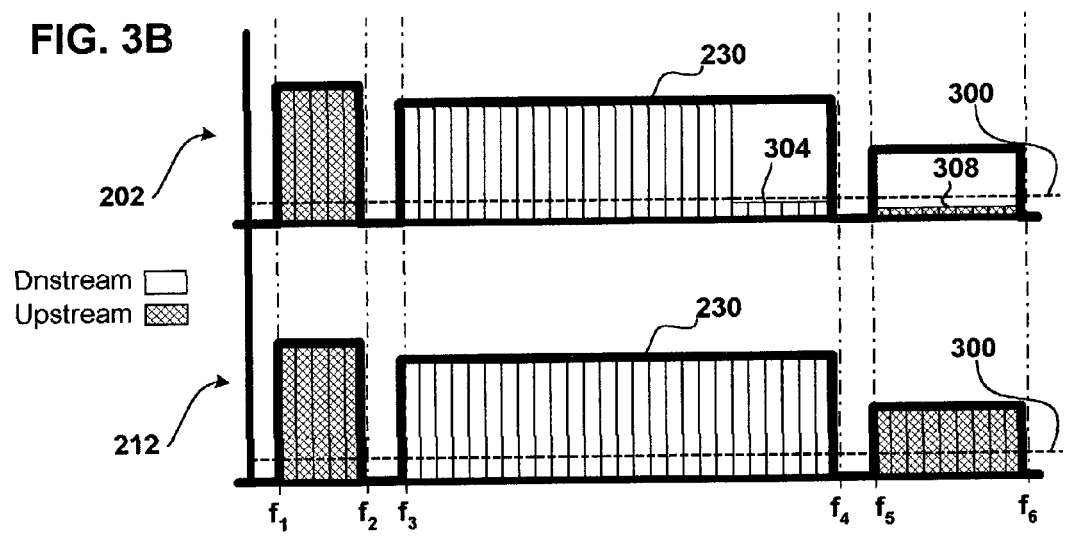
FIG. 4A   Bridge Taps
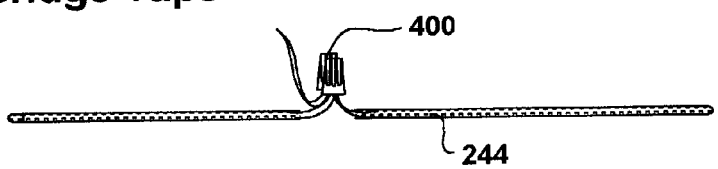
FIG. 4B
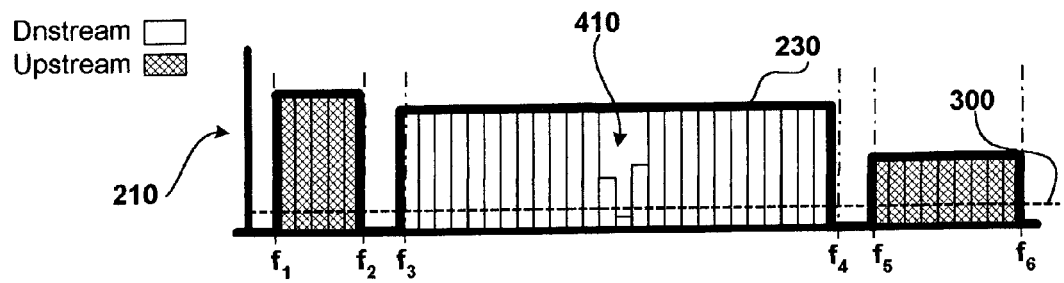

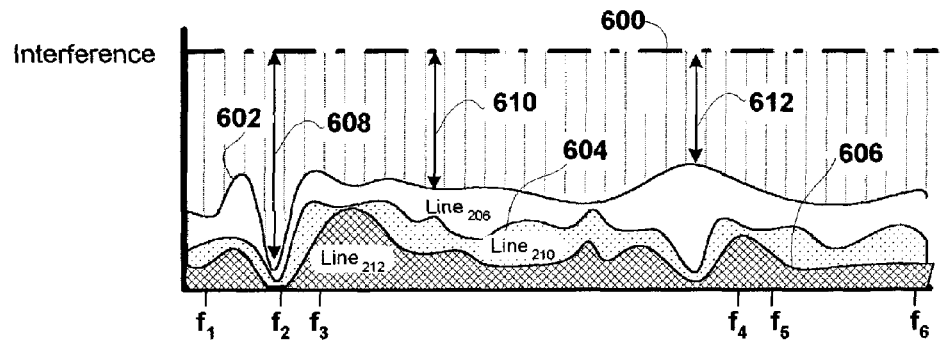
FIG. 6A Interference Profile on a Line k=202 from Other Lines$_{1..N}$ in Bundle
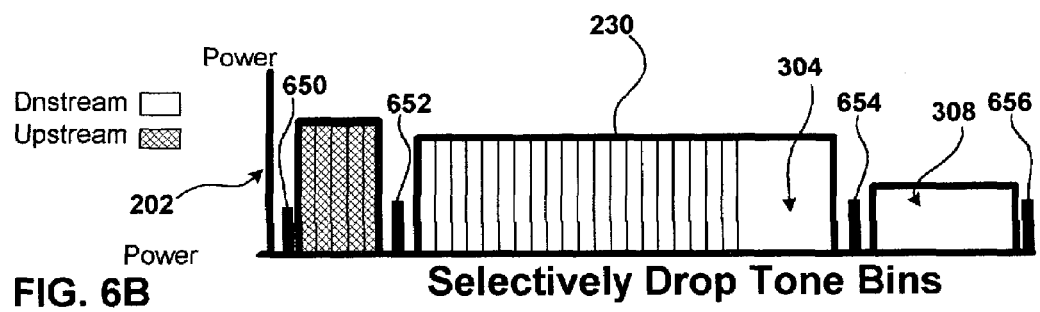
FIG. 6B Selectively Drop Tone Bins
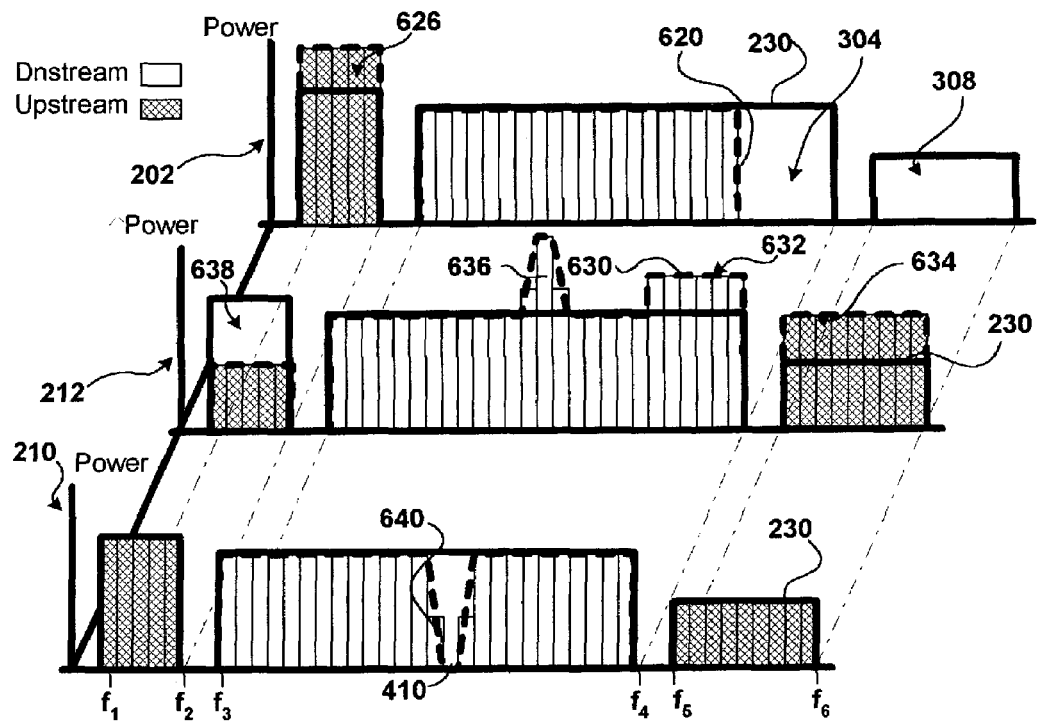
FIG. 6C Alter PSD Masks

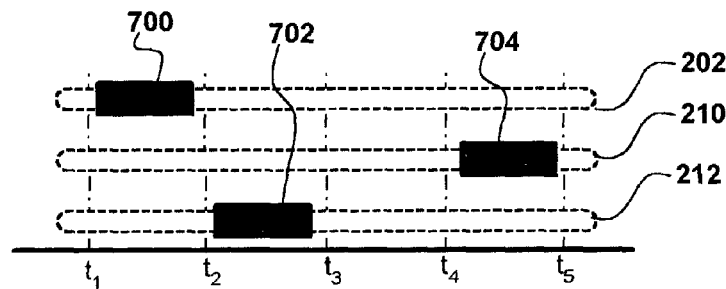
FIG. 7A     Subscriber Demand Profile
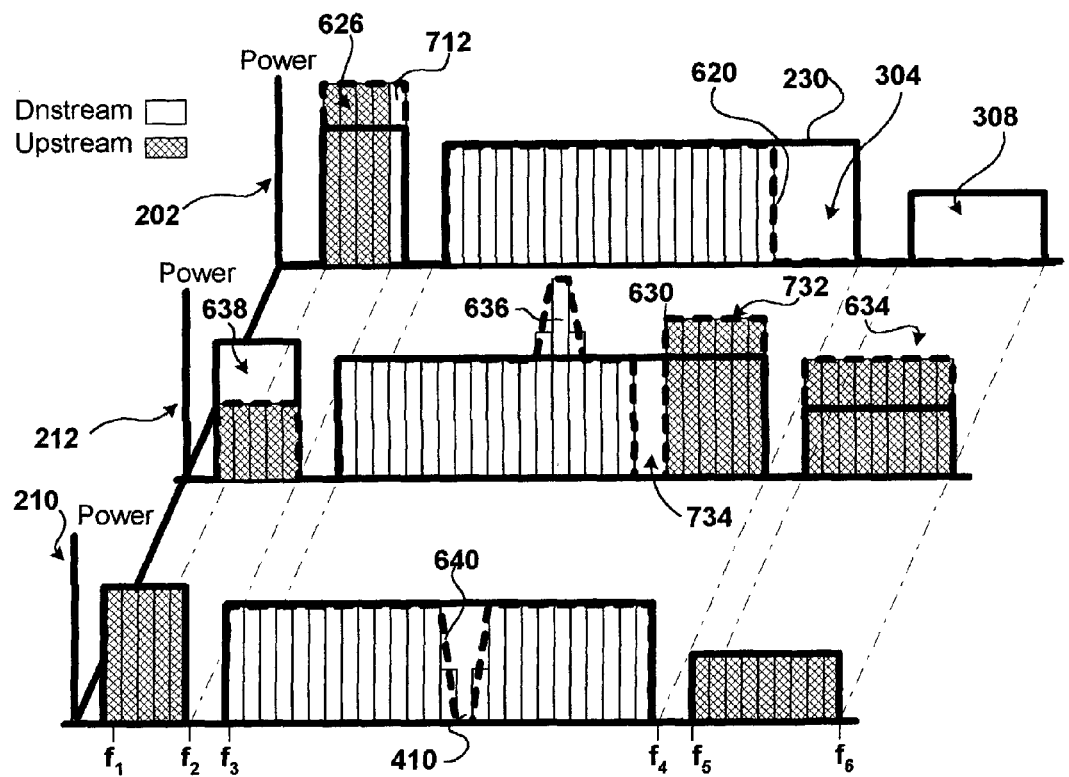
FIG. 7B     Alter PSD Masks and Bandplans

Bundle Table 1100

| Resource | Channel Physical | Protocol | Spectral Profile | | | | Interferors |
|---|---|---|---|---|---|---|---|
| | | | Loop Lg | Taps | Interference | Noise Mgn | |
| AFE₈₂₀ | 202 | VDSL | ... | ... | ... | ... | ... |
| | 204 | VDSL | ... | ... | ... | ... | ... |
| AFE₈₂₄ | 242 | ADSL | ... | ... | ... | ... | ... |
| | 246 | ADSL | ... | ... | ... | ... | ... |

Subscriber Table 1120

| Channel Physical | Bandwidth | | QOS | Demand Profile |
|---|---|---|---|---|
| | Guarantee | Cap | | |
| 246 | 1.00Mb/s | None | 1 | |
| 202 | .25Mb/s | 1.00Mb/s | 3 | |
| 242 | .25Mb/s | .25Mb/s | 10 | |

PSD Mask 1130

| Channel Physical | $f_1$ | $f_2$ | $f_{N-1}$ | $f_N$ |
|---|---|---|---|---|
| 246 | ... Dbm/Hz | ... | ... | ... |
| 202 | ... Dbm/Hz | ... | ... | ... |
| 242 | ... Dbm/Hz | ... | ... | ... |

Bandplan Up/Dn Stream 1140

| Channel Physical | $f_1$ | $f_2$ | $f_{N-1}$ | $f_N$ |
|---|---|---|---|---|
| 246 | ... | ... | ... | ... |
| 202 | ... | ... | ... | ... |
| 242 | ... | ... | ... | ... |

METHOD AND APPARATUS FOR OPTIMIZATION OF CHANNEL CAPACITY IN MULTI-LINE COMMUNICATION SYSTEMS USING SPECTRUM MANAGEMENT TECHNIQUES

CROSS REFERENCE TO RELATED APPLICATION

This application claims the benefit of prior filed now abandoned Provisional Applications No. 60/346,344 filed on Dec. 28, 2001 entitled "Information Tunneling and DMT Systems"; No. 60/353,432 filed on Jan. 31, 2002 entitled "Third Generation ADSL"; No. 60/395,635 filed on Jul. 12, 2002 entitled "PFMA"; No. 60/401,642 filed on Aug. 6, 2002 entitled "Optimal Transmission Methods over Copper Loop Plants"; and No. 60/430,248 filed on Dec. 2, 2002 entitled "Method and Apparatus for Programmable Frequency Multiple Access"; all of which are incorporated herein by reference in their entirety as if fully set forth herein.

BACKGROUND OF THE INVENTION

1. Field of Invention

This invention relates generally to communications, and more particularly, to a method and apparatus for optimizing channel capacity in bundled multi-line digital subscriber line communications.

2. Description of the Related Art

North American Integrated Service Digital Network (ISDN) Standard, defined by the American National Standard Institute (ANSI), regulates the protocol of information transmissions over telephone lines. High data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, SDSL, MDSL, RADSL, HDSL, etc. all of which are broadly identified as XDSL have been developed to increase the effective bandwidth of existing subscriber line connections, without requiring the installation of new fiber optic cable. An XDSL modem operates at frequencies higher than the voiceband frequencies, thus an XDSL modem may operate simultaneously with a voiceband modem or a telephone conversation.

Currently there are over ten discrete xDSL standards, including: G.Lite, ADSL, VDSL, SDSL, MDSL, RADSL, HDSL, etc. Within each standard there are several line codes or modulation protocols the most popular of which is discrete multi-tone (DMT). DMT modulation involves establishing a communication channel with a plurality of sub-channels each with a center frequency a.k.a. carrier tone. The sub-channels are frequency division multiplexed across the available bandwidth. Each sub-channel uses quadrature amplitude modulation (QAM) to modulate information. A typical DMT system utilizes a transmitter inverse fast Fourier transform (IFFT) and a receiver fast Fourier transform (FFT). XDSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop.

Any digital communication experiences signal interference, and communication protocols which support multiple sub-channels such as DMT are no exception. Interference can effect both the amplitude and the phase of the sub-channels. Such noise can arise across the time and/or frequency domains. At the receiver the data has to be separated from the noise. The current solutions to interference include individual and aggregate subscriber line approaches. Individual subscriber line approaches include: various forms of forward error correction (FEC) which add additional overhead to the data transmitted; carefully regulated band plans which frequency division multiplex upstream and downstream communications into discrete and non-overlapping frequency regions and capped transmission levels, a.k.a. power spectral densities (PSD) masks which limit interference between subscriber lines in a bundle by uniformly reducing bandwidth on all channels irregardless of the actual spectral profile of the channel. Aggregate subscriber line approaches involve vector cancellation applied to all the subscriber lines in a bundle with the training necessary to calculate vectors accomplished during the initialization of all lines.

With each improvement in bandwidth of multiple sub-channel communication systems there is a corresponding increase in noise, with the potential to reduce signal integrity to unacceptable levels. What is needed is a method and apparatus for increasing signal integrity in digital communication systems which support multiple sub-channels.

SUMMARY OF THE INVENTION

The present invention advantageously provides a method and apparatus for optimizing channel capacity of multi-line multi-tone communications such as X-DSL among subscriber lines which are bundled with one another. Channel capacity optimization is effected with knowledge of one or more of: the spectral profiles of all subscriber lines, the interference profiles of all subscriber lines with one another, the subscriber demand profiles and or data rates for all subscriber lines. Spectrum allocation effected under these conditions avoids the need for fixed Power Spectral Density (PSD) masks, band plans and decreases contention among subscriber lines on selected sub-channels and allows a more flexible architecture in which to effect multi-tone communications.

In an embodiment of the invention an apparatus for optimizing channel capacity of multi-tone communications effected by opposing sets of modems coupled to one another by a plurality of subscriber lines is disclosed. The apparatus includes a spectrum manager coupled to at least one of the opposing sets of modems. The spectrum manager includes: a profiler, a demand module and an optimizer. The profiler obtains from the at least one of the opposing sets of modems the spectral characteristics of each of the plurality of subscriber lines. The demand module determines for each of the plurality of subscriber lines the subscriber demand profile. The optimizer defines target parameters for at least one of bit loading, and power spectral density (PSD) for selected tones of the multi-tone communications based on the spectral characteristics from the profile module and the demand profiles from the demand module and downloads the target parameters to the at least one of the opposing sets of modems.

In alternate embodiments of the invention a method and a means for spectral management of multi-tone communications effected across a plurality of subscriber lines by opposing sets of modems coupled thereto is disclosed.

BRIEF DESCRIPTION OF THE DRAWINGS

These and other features and advantages of the present invention will become more apparent to those skilled in the art from the following detailed description in conjunction with the appended drawings in which:

FIGS. 3A-B are hardware block and graph diagrams respectively showing long and short subscriber line loops and the corresponding spectral characteristics of each.

FIGS. 4A-B are hardware block and graph diagrams respectively showing a subscriber line with a bridge tap and the corresponding spectral characteristics.

FIG. 6A is a graph showing the interference levels injected into a subscriber line from each of the other subscriber lines in the bundle.

FIG. 6B is a graph showing the spectral profile associated with an embodiment of the invention in which selected ones of the multiple tones used to modulate communications on a subscriber line are dropped when their bit loading falls below a threshold level.

FIG. 6C is a graph showing the spectral profile on several subscriber lines associated with an embodiment of the invention in which the Power Spectral Density (PSD) masks are varied based on the spectral profile of each line and the interference characteristics of the subscriber lines in the bundle.

FIG. 7A is a graph showing the demand profile of various subscriber lines in a bundle.

FIG. 7B is a graph showing the spectral profile on several subscriber lines associated with an embodiment of the invention in which both PSD masks as well as band-plans are varied based on the spectral profile of each line and the interference characteristics of the subscriber lines in the bundle.

FIGS. 11A-D show an embodiment of the data structures associated with the spectrum manager shown in FIGS. 8A-B.

DETAILED DESCRIPTION OF THE EMBODIMENTS

Figure 1:
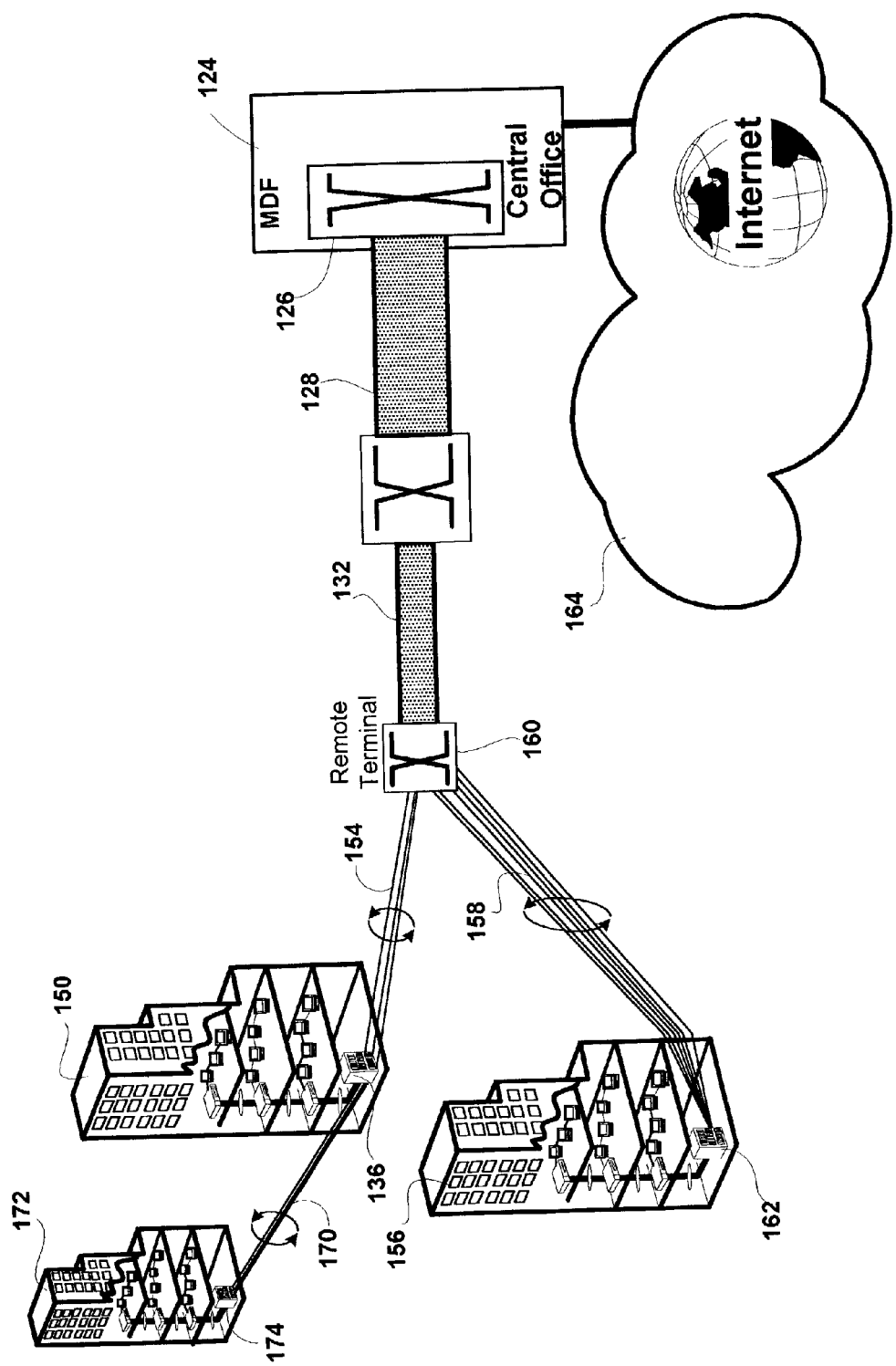
FIG. 1 shows an overall communication environment in which to practice the current invention including dynamic spectrum management of bundled subscriber lines between a remote access concentrator and a multi tenant unit (MXU) or between MXUs for example.

FIG. 1 shows an overall communication environment in which to practice the current invention including dynamic spectrum management of bundled subscriber lines between a remote access concentrator and a multi tenant unit (MXU) or between MXUs for example. A central office 124 is optically coupled via interface 126 and optical links 128, 132 with a remote terminal 160. At the remote terminal 160 subscriber line bundles 154, 170 are used to complete the high speed data links to Offices 150 and 172 and subscriber line bundle 158 is used to complete the high speed data links to Office 160. MxU Concentrators 136, 174, and 162 are provided in the basement of Offices 150, 172 and 156 respectively. The multi-line dynamic spectral management methods and apparatus described and discussed in the following description can be used to optimize data flow to meet subscriber requirements on any of the subscriber line bundles between the remote terminal and the MxU, or between the MxU of buildings 150, 172 to extend the reach of the high speed data path, or between an MXU in a basement and the networks on individual floors of a building.

Figure 2A:
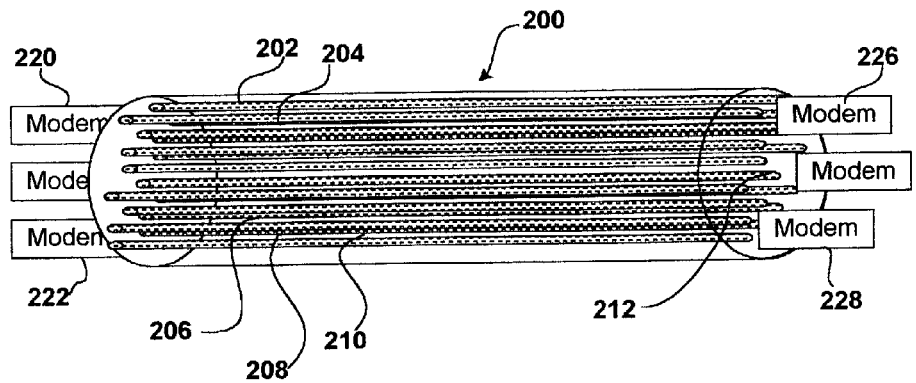
FIG. 2A is a hardware block diagram of an opposing sets of modems coupled to one another by corresponding subscriber lines within a bundle.

FIG. 2A is a hardware block diagram of an opposing sets of modems coupled to one another by corresponding subscriber lines within a bundle 200. Within one of the opposing sets modems 220-222 are references. Within another of the opposing sets modems 226,228 are referenced. Within the bundle which may include 60 or more subscriber lines, lines 202-212 are referenced.

Figure 2B:
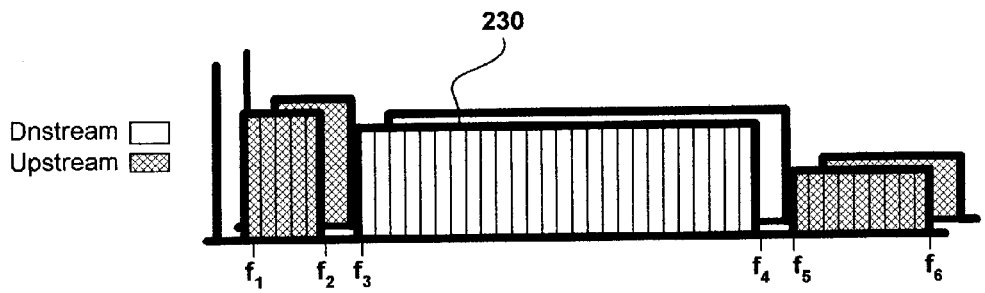
FIG. 2B is a graph showing the spectral profile of a multi-tone modulation protocol on representative ones of the subscriber lines.

FIG. 2B is a graph showing the spectral profile in terms of power vs. frequency for a digital multi-tone (DMT) modulation protocol on representative ones of the subscriber lines. DMT modulation involves establishing a communication channel with a plurality of sub-channels, each with a center frequency a.k.a. carrier tone. The sub-channels are frequency division multiplexed across the available bandwidth. Each sub-channel uses quadrature amplitude modulation (QAM) to modulate information. X-DSL is one of the popular families of modulation protocols using DMT modulation to carry information on subscriber lines. Upstream and downstream communications on the same subscriber line are frequency division multiplexed with a first set of one or more spectral regions accommodating upstream communications (represented with cross-hatch background) and a second set of spectral regions accommodating downstream communications (represented in clear background).

Upstream and downstream refer to the direction of transmission with transmission from the Central Office (CO) to the subscriber typically referred to as downstream and transmission from the subscriber to the CO typically referred to as upstream. For each protocol the PSD for each sub-carrier is set by standard. The solid line 230 represents the PSD mask for the upstream and downstream tones on one of the subscriber lines. There is a PSD mask for each subscriber line which sets the maximum transmit power for each of the sub-channels. The PSD mask is invariant for each protocol, e.g. G.Lite, ADSL, VDSL, SDSL, MDSL, RADSL, HDSL, etc. Thus is all lines in a bundle implement ADSL multi-tone modulation all lines will operate with the same PSD mask. The X-DSL connection requires an always on connection between each modem pair whether or not data is being transmitted. Thus lines with no data or modest data flow operate with the same PSD mask as lines with data flow.

Figure 2C:
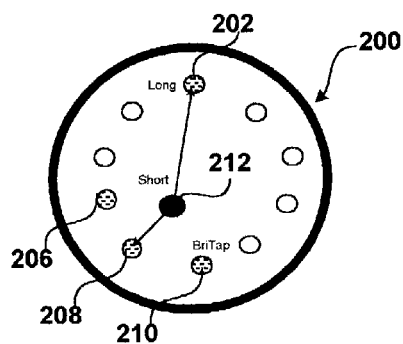
FIG. 2C is a cross-sectional view of the subscriber lines in the bundle shown in FIG. 2A.

FIG. 2C is a cross-sectional view of the subscriber lines in the bundle shown in FIG. 2A. Subscriber lines 202-212 are referenced. Any digital communication experiences signal interference, and communication protocols which support multiple sub-channels such as DMT are no exception. Interference can effect both the amplitude and the phase of the sub-channels. Such noise can arise across the time and/or frequency domains. Each of the subscriber lines in a bundle shields or interferes with other lines in the bundle in varying amounts across the time and/or frequency domains. In prior art systems this aggregate behavior is crudely addressed by the requirement of a corresponding fixed PSD mask on any of the subscriber lines which implement multi-tone modulation. All subscriber lines blast out sub-carrier signals at levels up to but not in excess of the corresponding PSD mask irregardless of the bit-loading on even the presence of any actual data modulated on any particular carrier.

The current invention alters the prior art methodology by managing subscriber lines in the aggregate rather than individually. This change of architecture allows significant improvements in data rates for the bundle and for selected subscriber lines within the bundle. The current invention manages a bundle of subscriber lines by determining the spectral characteristics, interference profile, and the subscriber requirements associated with each subscriber line and then setting the transmission characteristics of each subscriber line accordingly. Transmission characteristics include: bit-loading, PSD mask, and band-plan for each sub-channel on each subscriber line.

FIG. 3A is a hardware block diagram showing long and short subscriber line loops 202, 212 respectively.

FIG. 3B is a graph showing the spectral characteristics in terms of power vs. frequency for the long subscriber line 202 and the short subscriber line 212 at the receiving modem. Both subscriber lines implement the same multi-tone protocol and thus exhibit the same band-plan in terms of upstream and downstream tones. Both subscriber lines are shown initially implementing the same PSD mask 230 (solid line). Typically in comparing long vs. short loop spectral characteristics the longer line will exhibit a reduction in bit-loading on each sub-symbol associated with each of the high frequency tones. The high frequency tones are attenuated more severely with distance than are the low frequency tones. Attenuation exhibits itself in a reduction in the bit-loading associated with each sub-channel. Thus on a long line the higher frequency sub-channels may exhibit a reduction in bit loading from a standard of for example 12 bits per Hz per sub-symbol to 1-2 bits per Hz per sub-symbol. Thus the graph for line 202, the long subscriber loop, shows the high frequency upstream and downstream sub-channels 308 and 304 respectively falling below a threshold bit loading 300. Even though bit loading is severely reduced in the higher frequency regions 304, 308 the transmit power applied to each sub-channel remains at the corresponding power level dictated by the PSD mask 230. The graph for the short subscriber line 212 shows no such reduction in bit loading.

FIG. 4A is a hardware block diagram of a subscriber line 244 with a bridge tap 400. A bridge tap is a branch of two-wire subscriber line that is connected to the two-wire loop at one end, and is open (un-terminated) at the other end. Bridge taps cause signal loss in the attached subscriber line as a result of an impedance discontinuity at the point where the subscriber line is attached to tap. The impedance mismatch presented by the un-terminated end of the bridge tap reflects the signal back to the subscriber line. The length of a bridge tap and the quantity of bridge taps determine how much signal rejoins the subscriber line, and at what time relationship to the transmitted signal the reflections rejoin the subscriber line.

FIG. 4B is a graph showing the corresponding spectral characteristics for subscriber line 244 shown in FIG. 4A at the receiving modem. The line with a bridge tap will exhibit frequency specific degradation of the bit loading capacity in one or more of the sub-carriers. Thus one or more of the downstream sub-channels 410 may exhibit a reduction in bit loading from a standard of for example 12 bits per Hz per sub-symbol to a level below the threshold 300 of 1-2 bits per Hz per sub-symbol. Even though bit loading is severely reduced in the sub-channels 410 the transmit power applied to each sub-channel remains at the corresponding power level dictated by the PSD mask 230 (solid line).

Figure 5A:
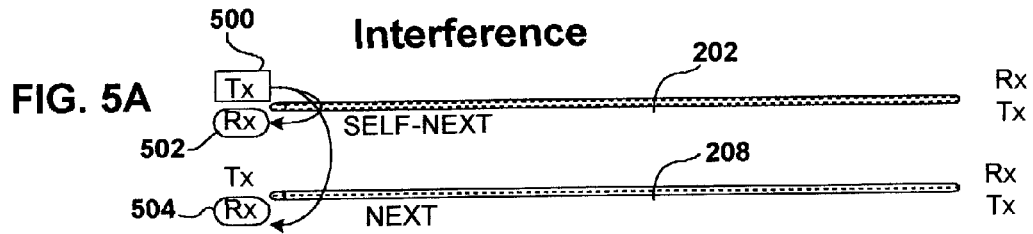
FIGS. 5A-C are hardware block diagrams showing various forms of internal and external interference exhibited between subscriber lines in a bundle.
Figure 5B:
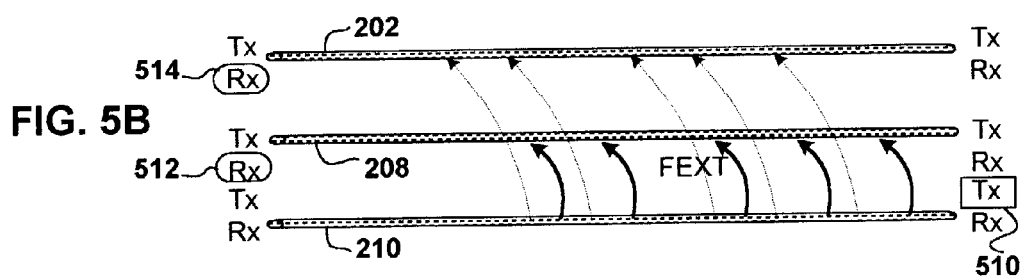
Figure 5C:
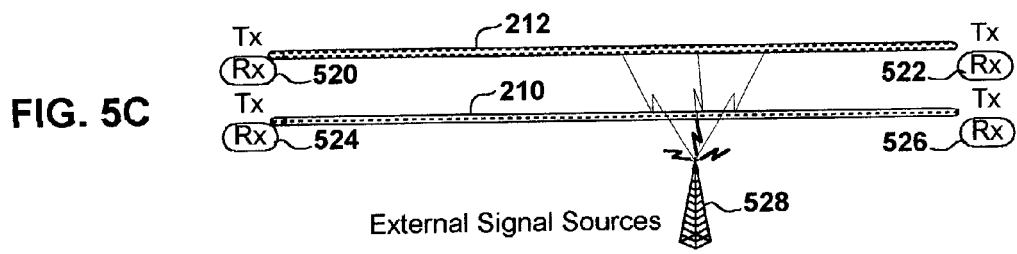

FIGS. 5A-C are hardware block diagrams showing various forms of internal and external interference exhibited between subscriber lines in a bundle. FIG. 5A shows a category of interference defined as Near End Cross-Talk (NEXT). NEXT is defined as cross-talk effected between a transmitting path and a receiving path of transceivers at the same end of two different subscriber loops within the same bundle. Self-Next is defined as cross talk between the transmitter and receiver coupled to one end of a single subscriber line. FIG. 5A shows NEXT between the transmitter 500 on one end of subscriber line 202 to the receiver 504 on the same end of the subscriber line 208. Self-NEXT is also shown between the transmitter 500 and receiver 502 on the same end of subscriber line 202.

FIG. 5B shows another category of interference defined as Far End Cross-talk (FEXT). FEXT is defined as cross talk between a transmitting path and a receiving path of transceivers at opposite ends of two different subscriber loops within the same bundle. Self-FEXT is defined as cross talk between the transmitter and receiver at opposite ends of the same subscriber line. FEXT is shown radiating from one to others of subscriber lines 202, 208, 210 in a bundle. Specifically the transmitter 510 of subscriber line 210 interferes in varying degrees with the reception of receivers 512, 514 on subscriber lines 202 and 208 respectively. The amount of FEXT experienced by lines 202, 208 will depend in part by their proximity in the bundle to the interferer line, e.g. subscriber line 210.

FIG. 5C shows interference from external source 528. The amount of interference with the reception of receivers 520-522 and 524-526 of subscriber lines 212, 210 respectively will be determined in part by the proximity and shielding of each subscriber line to the external signal source.

Figure 5D:
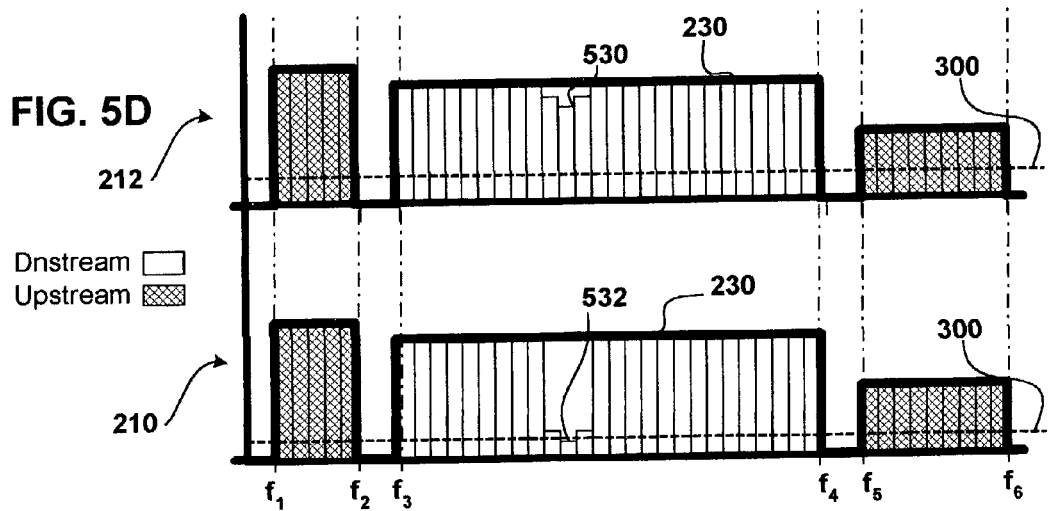
FIG. 5D is a graph diagram showing the corresponding spectral characteristics exhibited by the subscriber lines shown in FIGS. 5A-C.

FIG. 5D is a graph diagram showing the corresponding spectral characteristics in terms of power vs. frequency exhibited by the subscriber lines subject to the interference shown in FIGS. 5A-C. The spectral characteristics for subscriber lines 210-212 are shown. Both subscriber lines implement the same multi-tone protocol and thus exhibit the same initial band-plan in terms of upstream and downstream tones. Both subscriber lines are shown initially implementing the same PSD mask 230 (solid line). Both lines exhibit degradation in the bit loading of one or more of the sub-channels due to interference with the amount of degradation depending on several factors including the degree of electromagnetic coupling with the interference source. The graph for subscriber line 212 exhibits a mild degradation in bit-loading in several of the downstream sub-channels 530. The graph for subscriber line 210 exhibits a severe degradation in bit-loading in several of the downstream sub-channels 532 at least one of which exhibits a bit loading below a threshold value 300 of for example 1-2 bits per Hertz per sub-symbol. Even though bit loading is severely reduced on line 210 in the effected sub-channels 532 the transmit power applied to each of these sub-channels remains at the corresponding power level dictated by the PSD mask 230 (solid line).

FIG. 6A is a graph showing the interference levels expressed in terms of signal strength vs. frequency which are injected into a subscriber line from each of the other subscriber lines in the bundle. The graph for one of the subscriber lines in the bundle, e.g. subscriber line 202 is shown. All other lines in the bundle inject varying amounts of interference into every other line with which they are bundled. The susceptibility of a line to interference from other lines depends on factors including the degree of the electromagnetic coupling between interferor and interferee lines as well as the signal strength of the interferor on each sub-channel. In the graph interference from each line is additive with the interference from line 206, 210, 212 shown by corresponding stacked interference lines 602, 604, 606 respectively. The level of cumulative interference from all other subscriber lines on a selected subscriber line varies across the spectrum. The spectrum manager will typically target selected sub-channels on a subscriber line with low aggregate interference and corresponding high noise margins for additional bit loading. In the example shown in FIG. 6A low aggregate interference from all subscriber lines is exhibited in sub-channel(s) 608, moderate aggregate interference in sub-channel(s) 610 and relatively high aggregate interference in sub-channel(s) 612. In each sub-channel the contribution to the total interference by each interferor will vary. Thus in the sub-channel(s) 612 experiencing the highest aggregate interference most of that interference is due to interference from subscriber line 206. A flat line 600 is shown which represents the interference cap for a subscriber line. The spectrum manager of the current invention determines both the initial spectral characteristics of a line as well as interference profiles between lines, in order to efficiently allocate one or more of the following: bit-loading, PSD mask and band plans for each subscriber line to maximize dataflow through the bundle of subscriber lines.

FIG. 6B is a graph showing the spectral profile associated with an embodiment of the invention in which selected ones of the multiple tones used to modulate communications on a subscriber line are dropped when their bit loading falls below a threshold level or when the data rates which the subscriber has contracted for have been met. In the example shown the spectral profile for the long subscriber line 202 (See FIGS. 3A-B) is shown after modification by the spectrum manager shown in FIGS. 8-10. Without alteration of the PSD mask 230 (solid line) or the band plan, the spectrum manager effects by communication with at least one of the pair of modems coupled on either end of subscriber line 202 a reduction to zero in the bit loading of the underutilized high frequency downstream and upstream sub-channels 304 and 308 respectively. This dropping of sub-channels reduces interference and therefore signal to noise ratios on all other sub-scriber lines without significant reduction in the data rates for subscriber line 202.

Also shown in FIG. 6B and specifically the graph of the spectral profile of line 202 are sub-channels 650-656 which are located in cross-over or boundary regions between or at the extremes of upstream and downstream spectral regions of the band plan. No information is being transmitted in these regions. These sub-channels hereinafter identified as "gap" tones are utilized in an embodiment of the invention discussed in FIG. 12 to inject training sequences into successive ones of the subscriber lines in order for the spectrum manager to determine the interference profiles shown in FIG. 6A. By selecting tones in the gap regions of each subscriber line's band plan the spectrum manager is able to carry out co-channel interference determination during showtime operation of the channel and without any significant reduction of data rates during the interference determination. This is a significant advance over prior art techniques which require all channels to be re-initialized in order to determine co-channel interference. In a first embodiment of this method a training sequence is injected into the gap tones of each subscriber line by the spectrum manager and the cross-talk on the gap tones of the remaining subscriber lines is monitored by the spectrum manager and used to calculate an matrix which quantifies for each tone on each subscriber line the noise level injected into each tone, i.e. the interference level from each of the other subscriber lines. In an alternate embodiment of the invention the interference determination is conducted in parallel on all lines at once by injecting the same training sequence combined with a subscriber line specific orthogonal key codes using code division multiplexing techniques (CDMA) into the gap tones of each subscriber line and monitoring the same or proximate gap tones with a decoder using the key codes. The symbol period of these tones can be longer or shorter than the DMT symbol period. Once the information is recovered for any given line it the interferer channels can be ranked in order of importance within each sub-channel. A complete interference matrix as a function of frequency can be constructed. From this information either cross channel interference cancellation techniques or less granular energy balancing techniques can be used to optimize channel capacity.

FIG. 6C is a graph showing the spectral profile on several subscriber lines associated with an embodiment of the invention in which the Power Spectral Density (PSD) masks are varied based on the spectral profile of each line and the interference characteristics of the subscriber lines in the bundle. In the example shown the spectral profiles for subscriber lines 202, 210, 212 are shown (See FIGS. 3B, 4B) after modification of the PSD masks initiated by the spectrum manager. The spectrum manager effects by communication with at least one of the pair of modems coupled on either end of subscriber lines 202, 210, 212 alterations in the PSD masks used for each effected subscriber line during session initialization or show time. The long loop subscriber line 202 shows a new PSD mask 620 (dashed line) with reduced power levels in the high frequency downstream and upstream sub-channels 304, 308 and increased power levels in the low frequency sub-channels 626. The short loop subscriber line 212 shows a new PSD mask 630 (dashed line) with increased power levels in the high frequency downstream and upstream sub-channels 632, 634 in the areas vacated by subscriber line 202, with a increased power level 636 in the sub-channel(s) vacated by subscriber line 210 and decreased power levels in the low frequency sub-channels 628. This latter decrease in power levels reduces the interference from line 212 to line 202 in the low frequency sub-channels thereby allowing an increase in the PSD mask in this same set of sub-channels for subscriber line 202. Subscriber line 210 also exhibits a revised PSD mask 640 (dashed line) with a notch in the downstream tones 410 shown in FIG. 4B effected by the bridge tap. The above discussed modifications to the PSD masks of each subscriber line in the bundle reduces interference and therefore signal to noise ratios on all other sub-scriber lines and allows improvements in the data rates on all subscriber lines in the bundle.

FIG. 7A is a graph showing the demand profile of various subscriber lines in a bundle. Demand may vary for example by time of day with one subscriber line used mainly at night and primarily for downstream dataflow to the subscriber of video on demand for example, and another subscriber line used as a small business server with primary access during the day and the primary data flow in the upstream direction from the small business server through the CO to the Internet. In an embodiment of the invention the spectrum manager uses the demand profiles for each subscriber line to intelligently manage the available spectrum on each line as shown in the following FIG. 7B.

FIG. 7B is a graph showing the spectral profile on several subscriber lines associated with an embodiment of the invention in which both PSD masks as well as band-plans are varied based on the spectral profile of each line and the interference characteristics of the subscriber lines in the bundle. In the example shown the spectral profiles for subscriber lines 202, 210, 212 are shown (See FIGS. 3B, 4B) after modification of the PSD masks initiated by the spectrum manager. The spectrum manager effects by communication with at least one of the pair of modems coupled on either end of subscriber lines 202, 210, 212 alterations in the PSD masks used for each effected subscriber line during session initialization or show time. In addition to the revised PSD mask 620 (dashed line) which reduces power levels in the high frequency downstream and upstream sub-channels 304, 308 and increases power levels in the low frequency sub-channels 626 other changes effected by the spectrum manager are evidenced. Specifically, the band plan has been altered with sub-channel 712 converted to downstream communication rather than upstream. The short loop subscriber line 212 also shows, in addition to the revised PSD mask 630 (dashed line), a change in band plan with sub-channels 732 now dedicated to upstream communications rather then upstream and additionally downstream tones removed from service in the newly created cross over region 734. Subscriber line 210 also exhibits the revised PSD mask 640 (dashed line) discussed above in connection with FIG. 6C but its band plan has not been altered. The above discussed modifications to the PSD masks and band plan allow significant improvements in data rates of selected ones of the subscriber lines without significant degradation of the data rates of other of the subscriber lines in the bundle. The selection of a subscriber line among the plurality of subscriber lines for band plan alterations is based on several criteria including: the demand level requested by a subscriber, the temporal duration of the increased demand and the ability to meet the requested data rates and data rate directions, i.e. upstream or downstream, with the existing band plan. If a determination is made that the existing band plan can not meet the requested demand then a determination is made as to whether there is excess capacity in either the upstream or downstream direction of the existing band plan. If there is overcapacity in one or the other of the upstream or downstream direction then a determination is made as to which sub-channels or sets of sub-channels should be targeted for a switch from an upstream to downstream direction or vice versa as required by the requested demand. In an alternate embodiment of the invention band plan alterations may be effected by adding additional sub-channels to meet the requested data rates. In either case, sub-channels are chosen which minimize interference with other subscriber lines. A determination is then made as to whether with the selected sub-channels exhibit sufficiently low interference with other subscriber lines and their performance as to allow the band plan alteration. If all results are positive the band plan alterations are effected by the spectrum manager.

Figure 8A:
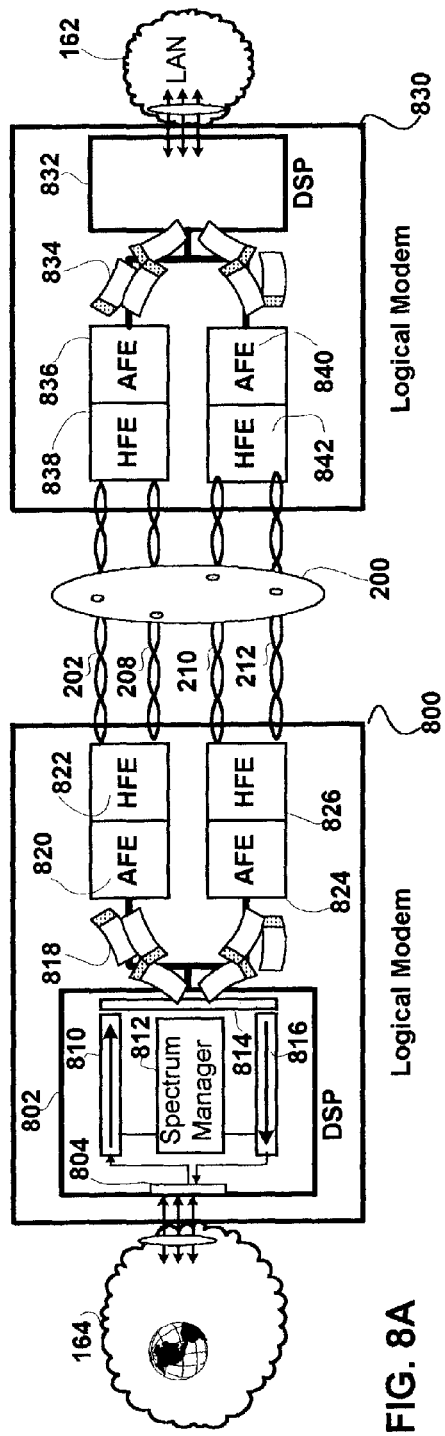
FIG. 8A is a hardware block diagram of opposing sets of logical modems driving multiple subscriber lines in a bundle, with spectrum management of each of the subscriber lines controlled by a spectrum manager in at least one of the sets of logical modems.

FIG. 8A is a hardware block diagram of opposing sets of logical modems 800, 830 driving multiple subscriber lines 202, 208, 210, 212 in a bundle 200, with spectrum management of each of the subscriber lines controlled by a spectrum manager in at least one of the pair of logical modems. Modem 800 provides multiple ports to couple with communication network 164. Modem 830 provides multiple ports to couple with communication network 162. Each logical modem includes a common digital signal processor driving multiple analog and hybrid front ends (AFEs) and (HFEs) respectively. Logical modem 800 includes AFE and HFE pair 820-822 driving subscriber lines 202-208 and AFE HFE pair 824-826 driving subscriber lines 210, 212. A digital signal processor (DSP) 802 communicates via a packet based bus 818 with the AFEs 820, 824 to send and receive data across the corresponding subscriber lines. The DSP includes in addition to transmit and receive path components 804, 810, 814, 816 a spectrum manager 812 which couples to the transmit and receive paths. The spectrum manager determines the spectral profile of each line, may also determine the interference profile and subscriber demand profile for each line and from one or more of these datum determines how best to optimize the spectrum accorded to each subscriber line in the bundle including: dropping or adding sub-channels, altering PSD masks, and or band plans. Logical modem 830 includes AFE and HFE pair 836-838 driving subscriber lines 202-208 and AFE HFE pair 840-842 driving subscriber lines 210, 212. A digital signal processor (DSP) 832 communicates via a packet based bus 834 with the AFEs 836, 840 to send and receive data across the corresponding subscriber lines. In selected embodiments of the invention no spectrum manager is required in DSP 832 with the overall operation controlled solely by spectrum manager 812 within modem 800 which might for example be located at a Central Office at which access to all the lines of a bundle is practicable.

Figure 8B:
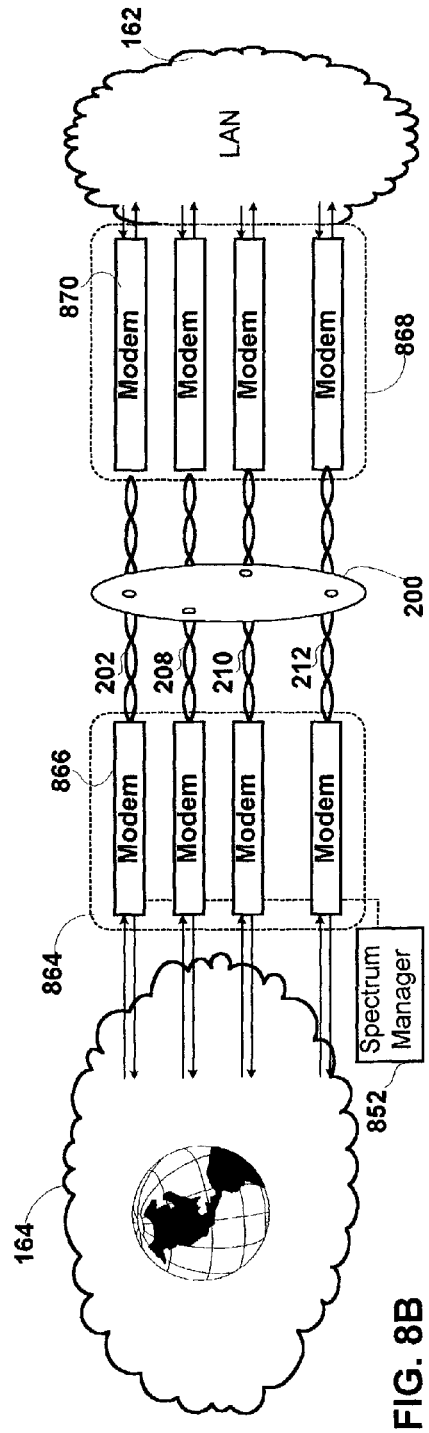
FIG. 8B is a hardware block diagram of opposing sets of physical modems driving multiple subscriber lines in a bundle, with spectrum management of each of the subscriber lines controlled by a spectrum manager coupled to at least one of the sets of physical modems.

FIG. 8B is a hardware block diagram of opposing sets 864, 870 of physical modems each coupled to a corresponding network 164, 162 respectively and each driving multiple subscriber lines 202, 208, 210, 212 in a bundle 200. Within modem set 864 modem 866 is referenced. Within modem set 868 modem 870 is referenced. Spectrum management of each of the subscriber lines is controlled by a spectrum manager 852 coupled to at least one of the sets of physical modems.

In an alternate embodiment of the invention opposing modems forming a transmitting and receiving set can mix logical modems such as shown in FIG. 8A with physical modems and such as shown in FIG. 8B.

Figure 9:
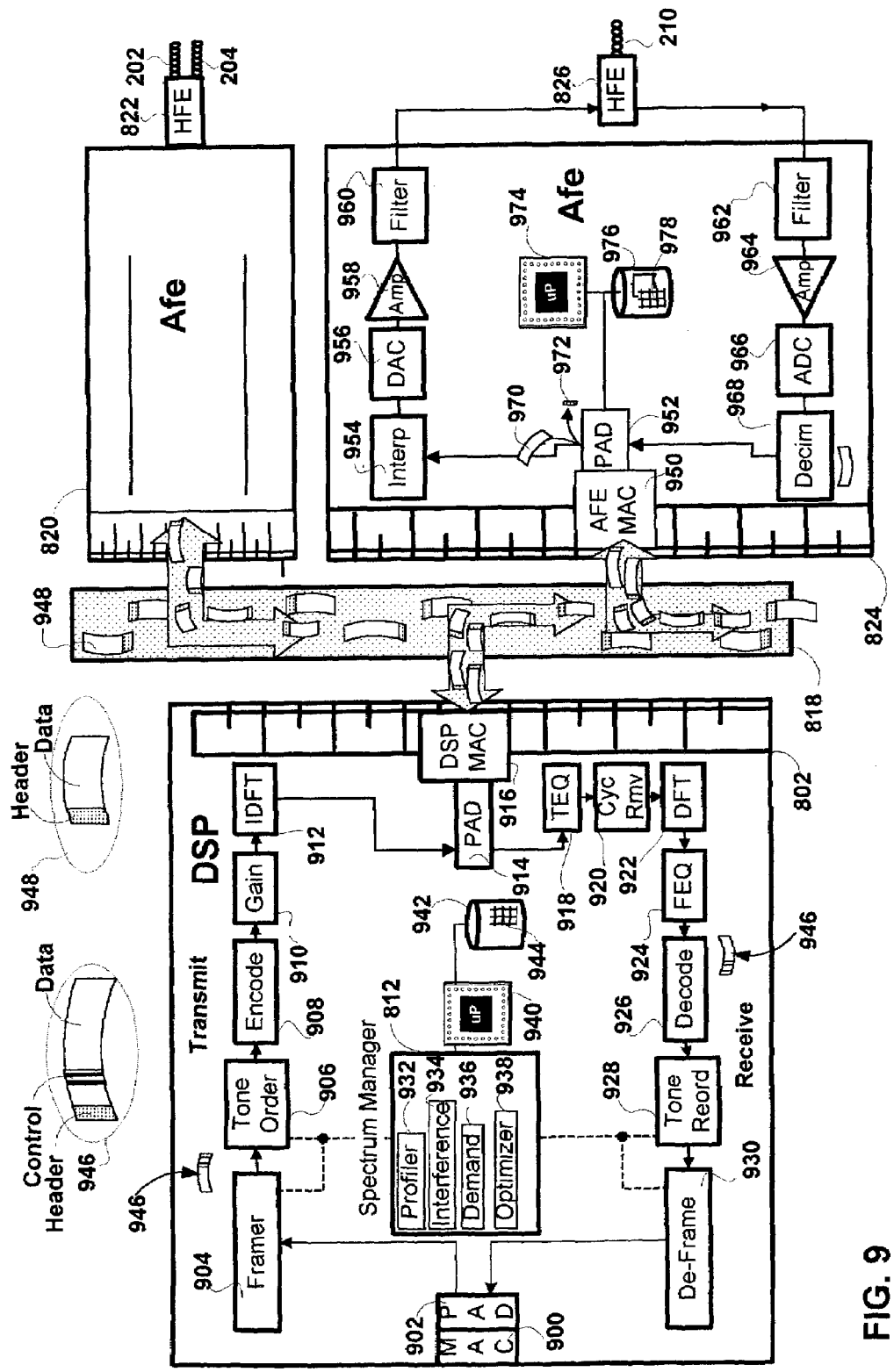
FIG. 9 is a detailed hardware block diagram of an embodiment of the logical modem shown in FIG. 8A with tone loading and PSD mask management capability.

FIG. 9 is a detailed hardware block diagram of an embodiment of the logical modem shown in FIG. 8A with tone loading and PSD mask management capability. In this embodiment of the invention multiple AFE's chips 820, 824 connect with a DSP chip 802 across bus 818. They all may be mounted on the line card. Packets of raw data are shown being transported between the DSP and AFEs as well as within each DSP and AFE. Packet processing between the DSP and AFE chips involves transfer of bus packets 948. Packet processing within a DSP may involve device packets 946. Packet processing within an AFE may involve raw data packets 970. These will be discussed in the following text. In this architecture a DSP 802 (See FIG. 8A) handles processing for a number of channels of upstream and downstream subscriber line communications via a number of analog front ends (AFE's) 820 and 824. Each AFE in turn accepts packets associated with one or more of subscriber lines to which each AFE is coupled. AFE 820 is shown coupled via HFE 822 with subscriber lines 202-204. AFE 824 is shown coupled via HFE 826 with subscriber line 210. The logical modem supports packet based processing of data between a DSP and AFE as well as within each DSP and AFE. Packet processing between DSP and AFE modules involves transfer over bus 818 of bus packets 948 each with a header and data portion. The header contains information correlating the data with a specific channel and direction, e.g. upstream or downstream, of communication. The data portion contains for upstream traffic digitized samples of the received data for each channel and for downstream packets digitized symbols for the data to be transmitted on each channel.

Packet processing within a DSP may involve device packets 946. The device packets may include a header, a control portion and a data portion. The header serves to identify the specific channel and direction. The header may contain control information for the channel to be processed. The control portion may also contain control parameters for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line. These modules, AFE and DSP, may be found on a single universal line card, or displaced from one another on separate line cards linked by a DSP bus or they may be found displaced across an ATM network.

The DSP 802 includes, a DSP medium access control (MAC) 916 which handles packet transfers to and from the DSP bus 818. The MAC couples with a packet assembler/disassembler (PAD) 914. For received DSP bus packets, the PAD handles removal of the DSP bus packet header and insertion of the device header and control header which is part of the device packet 946. The content of these headers is generated by the core processor 940 using statistics gathered by the de-framer 930. These statistics may include gain tables, or embedded operations channel communications from the subscriber side. The PAD embeds the required commands generated by the core processor in the header or control portions of the device packet header. Upstream device packets (Receive packets) labeled with the appropriate channel identifier are passed through the time domain equalizer (TEQ) 918 and the cyclic prefix/suffix remover 920 to the discrete Fourier transform (DFT) engine 922. The DFT engine 922 fetches packets and processes the data in them in a manner appropriate for the protocol, channel and command instructions, if any, indicated by the header. The processed data is then passed to the frequency domain equalizer (FEQ) 924, the decoder 926, the tone re-orderer 928 and the de-framer 930. Each module reads the next device packet and processes the data in it in accordance with the instructions or parameters in its header. The processed de-framed data for each channel is passed from the de-framer to the PAD 902 for assembly and delivery by the MAC 900 to the network 164 (See FIG. 8A).

Control of the receive modules, e.g. DFT engine 922, FEQ 924, etc. is implemented as follows. The core processor 940 gathers statistical information on each channel including gain tables, or gain table change requests from the subscriber as well as instructions in the embedded operations portion of the channel. Those tables 944 are stored by the core processor in memory 942. When a change in gain table for a particular channel is called for the core processor sends instructions regarding the change in the header of the device packet for that channel via the PAD 914 and writes the new gain table to a memory which can be accessed by the appropriate module in the receive path. This technique of in band signaling with packet headers allows independent scheduling of actions on a channel by channel basis in a manner which does not require the direct control of the core processor. Instead each module in the receive path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different XDSL protocols, e.g. a packet with ADSL sample data followed by a packet with VDSL sampled data. For example as successive packets from channels implementing G.Lite, ADSL and VDSL pass through the DFT 922 the number of tones will vary from G.Lite, ADSL and for VDSL. The framer 904 and de-framer 930 will use protocol specific information associated with each of these channels to look for different frame and super frame boundaries. The measured level of each tone is maintained by processor 940 in memory 942. This same memory may be utilized for calculating the inverse channel model for each of the channels to determine the amount of pre-compensation to be applied to downstream data on each of the channels.

On the downstream side (Transmit path) the same architecture applies. Packet data is wrapped by PAD 902 with a device header the contents of which are again dictated by the core processor 942. That processor may embed control information related to the processing of each channel in the packets corresponding to that channel. The packetized data is passed to the framer 904 for placement in the appropriate DSL frame. From the framer data is processed in the tone orderer 906, encoder 908, gain scaler 910 and inverse discrete Fourier transform (IDFT) engine 912. On the transmit path as well incline control headers 946 may be utilized to control processing of the digital components on the transmit path. These later headers are not however required for the practice of the invention. These headers are discarded before transmission to the AFE.

From the IDFT 912 each updated device packet with a digitized symbol(s) for a corresponding channel is sent to PAD 914 where any device or control header is removed. The DSP PAD places the DSP packet with an appropriate header to DSP MAC 916 for placement onto the DSP bus 818 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet 948 on the bus 818 directed to AFE 824 is detected by AFE 824's MAC 950 on the basis of information contained in the packet header. The packet is passed to PAD 952 which removes the header 972 and sends it to the core processor 974. The packet's header information including channel ID is stored in the core processor's memory 976. The information is contained in a table 978. The raw data 970 is passed to interpolator 954. On the transmit path, the interpolator reads a fixed amount of data from each channel. The amount of data read varies for each channel depending on the bandwidth of the channel. The amount of data read during each bus interval is governed by entries in the control table for each channel which is established during channel setup and is stored in memory 976. The interpolator up samples the data and passes it to the digital-to-analog converter (DAC) 956. The DAC converts the digitized symbol for each of the input signals on each of the input signal lines/channels to corresponding analog signals. These analog signals are introduced to the amplification stage(s) 958, from which they are passed to analog filter(s) 960 and then via an associated HFE, e.g. HFE 826 to a corresponding subscriber line e.g. subscriber line 210. Where the AFE drives more than one subscriber line additional amplifiers and filters may be utilized to drive each additional line.

On the upstream path, the receive path, individual subscriber lines couple to the receive path. Subscriber line 210 couples through HFE 826 to the analog filer 962. The analog filter provides input to the corresponding line amplifier 964. From the line amplifier the received analog data is digitized in the analog to digital converter (ADC) 966. The digitized output is passed through the decimator 968 to the PAD 952. The PAD wraps the raw data in a DSP header with channel ID and other information which allows the receiving DSP to properly process it. From the PAD it is passed to the AFE MAC 950 for wrapping in a bus packet 948 and delivery to the DSP 802.

The spectrum manager 812 which in the embodiment shown in FIG. 9 is part of the DSP, interfaces with and manages the spectral profiles of all subscriber lines driven by the DSP 802 through associated AFE, HFE pairs 820-822 and 824-826. The spectrum manager includes in this embodiment a profiler 932 and an optimizer 938 and may include as well a interference module 934, and a demand module 936. The profiler couples with the processor 940 and/or with appropriate ones of the modules on the transmit and receive paths to obtain the spectral profile of each channel after the initialization of the channel. These parameters may include: loop length, gain tables, PSD masks and sub-symbol size (a.k.a bit loading) for each of the tones of each of the channels.

In an embodiment of the invention the spectrum manager has two phases of operation, specifically determining the spectral profiles of all subscriber lines in a bundle and then allocating updated spectral profiles to all of the subscriber lines to improve the data throughput. During the spectral profiling phase, the spectrum manager determines the relative lengths of each of the subscriber lines based either on bit loading levels in each of the sub-channels or on an actual comparison of transmit and receive power levels and the attenuation of same across the entire spectrum. Either of these parameters are already part of the existing X-DSL specifications and are exchanged between modem pairs during initialization. The spectrum manager may also determine across the entire spectrum of each subscriber line those sub-channels with bit-loading below a threshold level, due either to bridge taps, or interference. After spectral profiling is complete the spectrum manager and specifically the optimizer module 938 thereof initiates an allocation phase. In the allocation phase the high frequency upstream or downstream sub-channels of long lines are designated to be dropped. Other mid and low frequency sub-channels which also exhibit bit loading levels below the threshold value may also be designated at this time. Short lines may have selected low frequency sub-channels designated for dropping as well since they will be picking up additional bit loading capacity due to a reduction in interference in the high frequencies from the sub-channels dropped on the long lines. After all these determinations are made the new spectral profile target parameters are downloaded by the optimizer module of the spectrum manager to the appropriate modules on the transmit path of the DSP and the effected channels are subject to another round of initialization, which will hereinafter be identified as spectral optimization. The parameters downloaded may include, revised gain tables, or tone loading for the effected subscriber lines and sub-channels thereof.

In an alternate embodiment of the invention the spectral optimization may be iterated until data rates on each of the subscriber lines have reached a maximum.

In still another embodiment of the invention the spectrum manager has an interference determination phase of operation in addition to those discussed above. The interference determination phase comes after the spectral profiling phase and before the spectral allocation phase. The interference determination phase is designed to allow a more precise allocation of revised spectral profile targets based on detailed co-interference parameters between subscriber lines determined during the interference determination phase. The interference determination phase commences after spectral profiling. A training sequence is sent by the interference module 934 on selected sub-channels of successively selected subscriber lines while interference on the same sub-channels is monitored on the receive path of all of the other lines in the bundle. This is continued until all subscriber lines have performed as both interferer and interferee and the corresponding data accumulated. Based on this data an interference matrix is calculated the result of which is shown in FIG. 6A. The interference matrix shows for each sub-channel on each subscriber line the relative interference in terms of noise injected from all other subscriber lines. In an embodiment of the invention the sub-channels on which the training sequence is injected in each subscriber line are located at cross-over and boundaries of the upstream and downstream spectral regions of each subscriber line as shown by the gap tones 650-656 in FIG. 6A. This reduces the impact of interference determination on lines already in service when a new line "wakes up". After spectral profiling and interference determination are complete the spectrum manager and specifically the optimizer module 938 thereof initiates an allocation phase. Allocation is based both on dropping underutilized sub-channels, e.g. those which fall below a threshold value, on subscriber lines as well as generating new PSD masks with higher transmit power levels in the dropped sub-channels for those subscriber lines for which the higher transmit power levels will result in the least interference with other subscriber lines. This later determination results directly from the interference parameters determined during the interference determination phase. After all these determinations are made the new spectral profile target parameters are downloaded by the optimizer module of the spectrum manager to the appropriate modules on the transmit path of the DSP and the effected channels are subject to another round of initialization, which will hereinafter be identified as spectral optimization. The parameters downloaded may include, revised PSD masks, gain tables, or tone loading for the effected subscriber lines and sub-channels thereof.

In yet another embodiment of the invention the spectral manager includes a demand profiling phase of operation in addition to the above discussed spectral profiling, interference determination, and allocation phases of operation. The demand profiling phase comes between the spectral profiling and allocation phases. During this phase the demand module 936 determines subscriber demand profiles. These will be used in the allocation phase to determine on which subscriber lines additional sub-channels can be dropped and on which subscriber lines band plans can be revised. The dropping of sub-channels on one subscriber line increases the bit loading capacity of other subscriber lines utilizing the same sub-channel. Consider for example a particular sub-channel of a bundled subscriber line that is FEXT limited due to interference from other lines in the bundle. If the spectrum manager determines that one or more of the subscriber lines which interfere with one another on this sub-channel is above at the subscriber demand capacity, then the spectrum manager will direct those subscriber lines above capacity to drop the selected sub-channel in favor of others of the subscriber lines which are below capacity. Subscriber demand profiles may be accumulated by the spectral manager directly by maintaining a rolling history of subscriber demand on each of the subscriber lines to which the spectrum manager is coupled or by access to subscription data maintained by the Telco or other subscriber line provider (See FIG. 11B). After spectral profiling, interference determination and demand determination are complete the optimizer module of the spectrum manager initiates the allocation phase. Allocation is based both on dropping underutilized sub-channels of each subscriber line based either on bit-loading or low demand profiles, generating new PSD masks with higher transmit power levels in the dropped sub-channels for the same or other subscriber lines in the bundle and revising the band plans for those subscriber lines with high demand profiles. After all these determinations are made the new spectral profile target parameters are downloaded by the optimizer module of the spectrum manager to the appropriate modules on the transmit path of the DSP and the effected channels are subject to another round of initialization, which will hereinafter be identified as spectral optimization. The parameters downloaded may include, revised band plans, PSD masks, gain tables, or tone loading for the effected subscriber lines and sub-channels thereof.

The spectrum manager in an alternate embodiment of the invention performs similar operations to those discussed above when coupled to a physical modem set/pool as shown in FIG. 9B.

Figure 10:
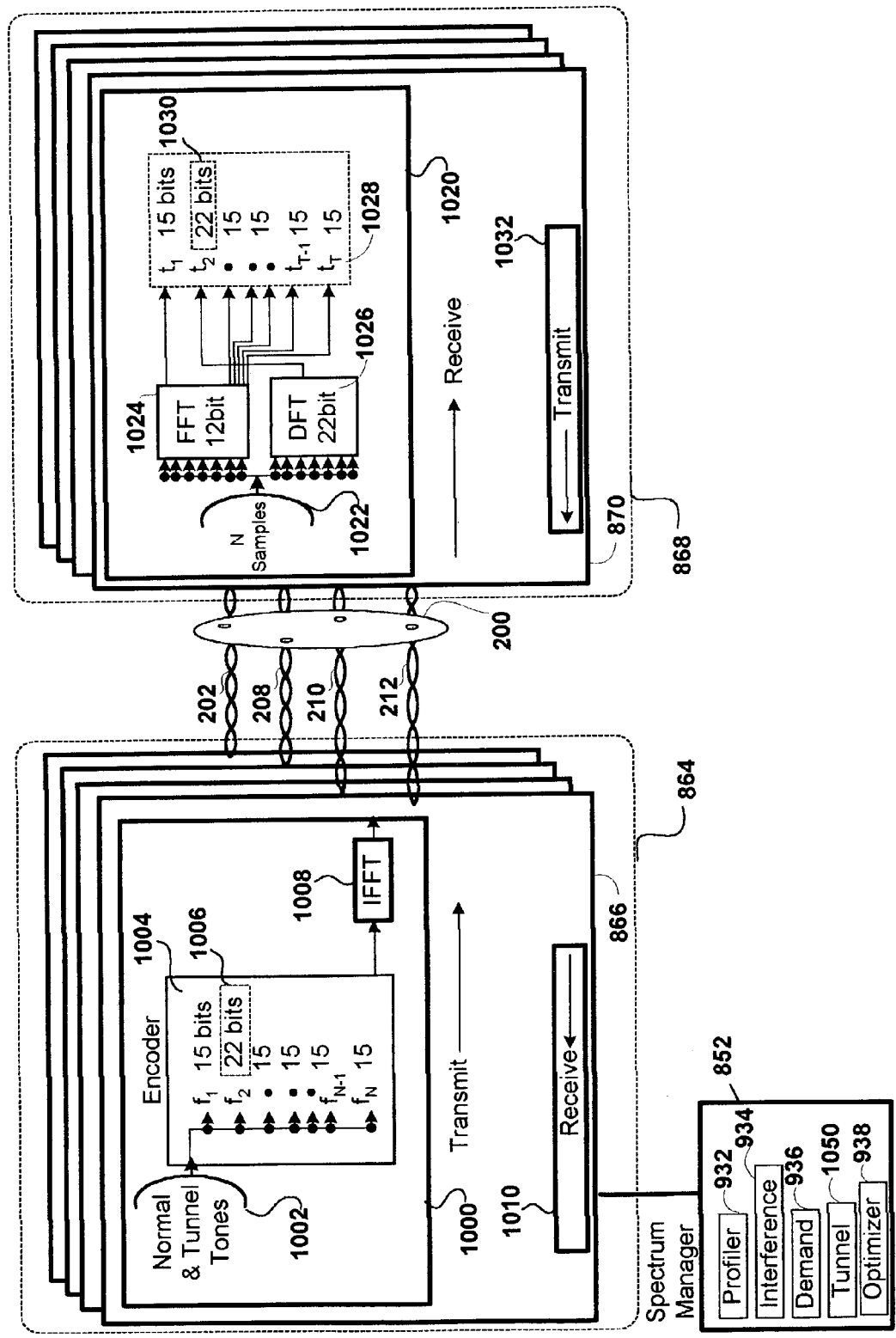
FIG. 10 is a detailed hardware block diagram of an embodiment of the invention shown in FIG. 8B in which selected modems within the opposing sets of modems include tone tunneling enhancements, and in which the spectrum manager further includes a tunnel tone module.

FIG. 10 is a detailed hardware block diagram of an embodiment of the invention shown in FIG. 8B in which selected modems within the opposing sets of modems include tone tunneling enhancements, and in which the spectrum manager further includes a tone tunneling module. The tone tunneling capability of this embodiment allows the spectrum manager to increase the bit-loading in selected tone bins above the capacity of the fast Fourier transform (FFT) engine on the receive path of each modem. The spectrum manager 852 is shown coupled to the modem set 864. The spectrum manager includes: a profiler 932, the interference module 934, the demand module 936, the tone tunneling module 1050 and the optimizer 938. The modems 866 and 870 within the opposing sets of modems 864, 868 respectively are shown. Each modem includes a set of transmit and receive path components, 100, 1010 respectively in modem 866 and 1032, 1020 respectively in modem 870. The modems in each set couple to one another via a corresponding one of subscriber lines 202, 208, 210, 212 which occupy a common bundle 200. Selected portions of the transmit path 100 of modem 866 are shown, specifically the encoder 1004 and the inverse fast Fourier transform (IFFT) engine 1008. The encoder 1004 converts the incoming bit stream 1002 from bits into sub-symbols expressed as complex numbers. The complex numbers express the target phase and amplitude relationship for the modulation of the data with the corresponding tone. The IFFT will convert the tones from the frequency to the time domain for transmission across the corresponding subscriber line. All tones $f_i$-$f_n$ are thus encoded. Selected tones e.g. tone 1006 are designated by the tone tunneling module 1050 of the spectrum manager to carry additional information. These tunnel tones have bit loading, and corresponding constellation sizes above that which the fast Fourier transform (FFT) engine on the receive path can accommodate. In an embodiment of the invention all tones are transmitted with this higher resolution though only the tunnel tones have information content which requires their reception at a higher resolution. In an alternate embodiment of the invention the FFT uses row and column specific transform modifications to carry the increased precision through only on a selected row and column combination. The spectrum manager selects the appropriate tones based on the spectral profile of all subscriber lines determined by the profiler 932, the interference between subscriber lines as determined for example by the interference module 934 and the modem pair configured to respond to this request exchanges control information identifying which tones have are carrying the additional information, i.e. the tunnel tones. On the receive path 1020 of the receiving modem 870 both a FFT engine 1024 and a discrete Fourier transform engine 1026 are coupled in parallel to the incoming stream 1022 of time domain samples from the analog portion of the modem's receive path (not shown). The samples are processed in parallel in the FFT and DFT engines. The FFT engine converts the time domain samples to corresponding sub-symbols in the frequency domain with each sub-symbol having a default precision of for example 15 bits. These are decoded in the decoder 1028 from complex to real numbers. Selected ones of the tones, i.e. the tunnel tones, converted by the FFT lack the precision necessary to decode all the information with which they were transmitted. Tunnel tone 1030 for example was encoded and transmitted with 22 bits precision and a corresponding enhanced constellation size. The DFT 1026 provides this extra precision on the receiving modem. It accepts initialization information from modem 1000 as to which tone(s) to target for time to frequency domain transformation and using all received time domain samples converts only the targeted tunnel tones form the time to the frequency domain. The resultant sub-symbols are substituted in the decoder, for the results produced by the FFT and are then decoded. Thus, tone tunneling allows for dynamic allocation by the spectrum manager 852 of selected tones for additional bit loading and hence information transfer without an overall increase in the complexity of the FFT engine of the modem. The price for this increased capacity is the addition of an auxiliary DFT engine to handle the dynamically allocated tunnel tones.

FIGS. 11A-D show an embodiment of the data structures associated with the spectrum manager shown in FIGS. 8A-B. A bundle table 1100, a subscriber table 1120 a PSD mask table 1130 and a band plan table 1140 are shown. The bundle table stores the spectral profile and interference profiles used by the spectrum manager in dynamically allocating spectrum to each subscriber line in a bundle. The bundle table includes records for each subscriber line. Each record in the embodiment shown includes: a resource field 1102 identifying the physical hardware coupled to a subscriber line, a physical channel field 1104 identifying the subscriber line handled by the resource, a protocol field 1106 indicating the X-DSL protocol modulated on the subscriber line, spectral profile field(s) 1108 with the spectral profile of each subscriber line as uploaded to the spectrum manager by the corresponding modem, and interferor fields 1110 with the interference profile parameters for each subscriber line as determined by the spectrum manager. The spectral profile fields are determined by each modem during initialization and uploaded to the corresponding spectrum manager. The spectral profile may be expressed in a range of parameters. These may include: gain tables and bit loading for each tone bin, or as shown in FIG. 11A may include: loop length, taps, interference levels and or noise margins. FIG. 11B shows an embodiment of a subscriber table accessed by embodiments of the spectrum manager which include a demand module. The parameters in the subscriber table records quantify subscriber demand profiles for each subscriber line 1122. Parameters include bandwidth guarantees and caps 1124, quality of service (QOS) 1126, and may include demand profiles 1128. Demand profiles, e.g. historical utilization patterns by time of day in terms of bandwidth and direction (up/downstream) may be determined by the spectrum manager demand module based on reports from each of the modems as to data rates and direction of data flow by time of day. FIG. 11C shows an embodiment of the PSD mask table with individual records for each subscriber line 1132 indicating power levels in each sub-channel 1134-1138 covered by the PSD mask. FIG. 11D shows an embodiment of the band plan table with individual records showing band plans for each of the subscriber lines 1142 showing the direction upstream/downstream of data flow for each sub-channel 1144-1148 for example.

Figure 12:
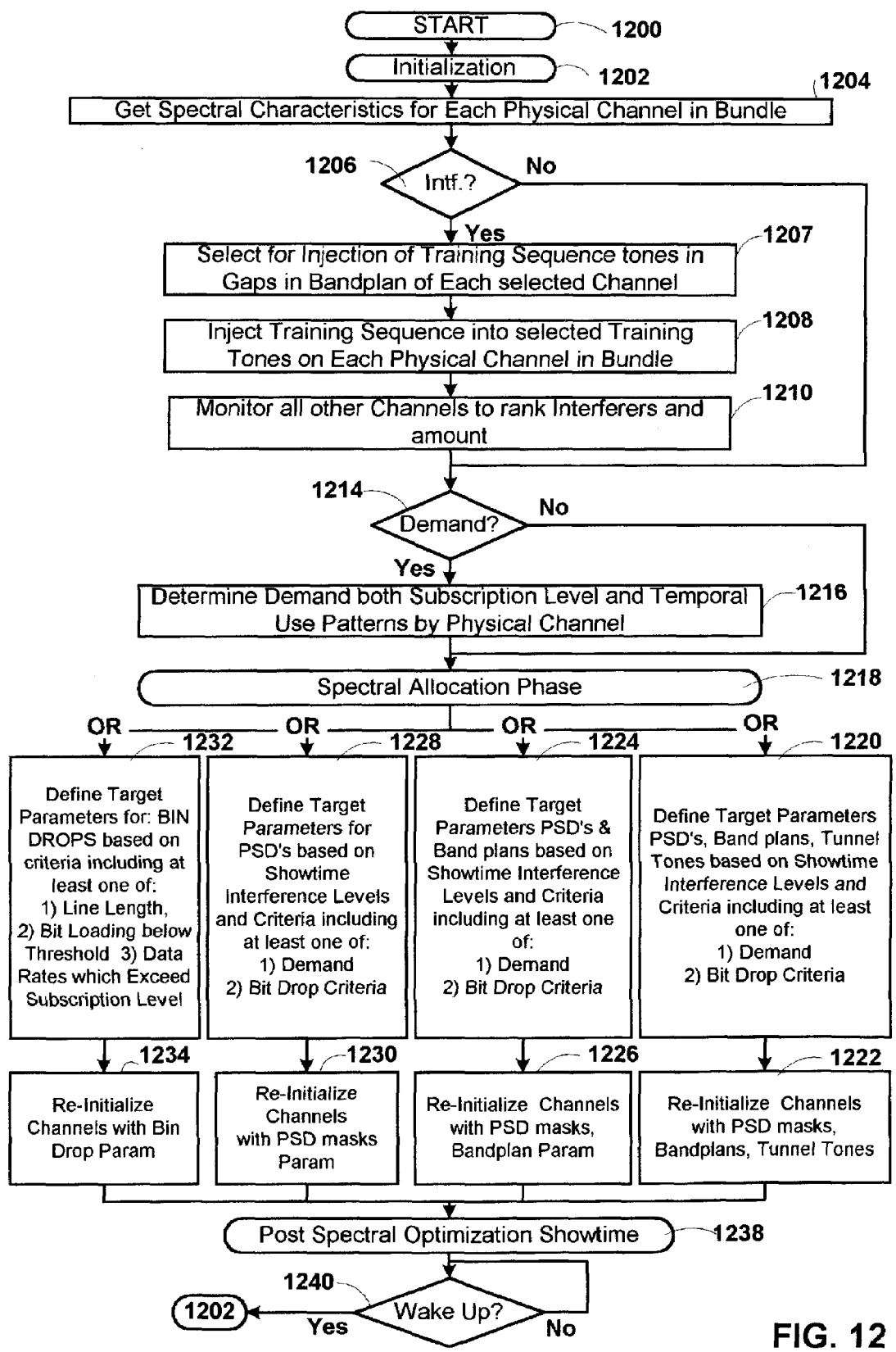
FIG. 12 is a process flow diagram of the processes associated with an embodiment of the invention in which the spectrum manager manages profiling, interference determination, demand determination and spectral allocation for each of the subscriber lines in the bundle.

FIG. 12 is a process flow diagram of the processes associated with an embodiment of the invention in which the spectrum manager manages profiling, interference determination, demand determination and spectral allocation for each of the subscriber lines in the bundle. After initialization in process 1200 control is passed to process 1202 in which subscriber lines in the bundle are initialized. After initialization the spectral characteristics of each subscriber line are uploaded to the spectrum manager in the spectral profile determination phase 1204 of the spectrum manager's operation. The spectrum manager may determine the spectral profile from a number of parameters provided by the modems. The modems may provide the relative lengths of each of the subscriber lines based either on bit loading levels in each of the sub-channels or on an actual comparison of transmit and receive power levels and the attenuation of same across the entire spectrum. Either of these parameters are already part of the existing X-DSL specifications and are exchanged between modem pairs during initialization. The modems may also provide sub-symbol sizes for each tone after initialization, from which the spectrum manager may determine across the entire spectrum of each subscriber line those sub-channels with bit-loading below a threshold level, due for example to: line length, bridge taps, or interference. The modems may also provide net interference or noise margins on each sub-channel. Once any or all of these parameters are processed by the spectrum manager the spectral profiling phase of operation is complete and control is passed to decision process 1206.

In decision process 1206 a determination is made as to the presence of an interference phase of the spectrum manager's operation. If not control passes to decision process 1214. In the event such a phase is provided for, control is passed to processes 1207, 1208, 1210 associated with the interference determination phase. The interference determination portion of the spectrum manager's operation is designed to allow a more precise allocation of revised spectral profile targets based on detailed co-interference parameters between subscriber lines determined during this portion of the spectrum manager's operation. In an embodiment of the invention the interference determination can be accomplished during showtime operation of each channel using "gap" tones (See FIG. 6B) for the injection of training sequences into successive ones of the subscriber lines in order for the spectrum manager to determine the interference profiles shown in FIG. 6A. These gap tones are selected in process 1207 and are located in the boundary or cross-over regions of upstream and downstream data flow.

In process 1208 a training sequence is injected into the gap tones selected in process 1207 on each physical channel of the bundle either directly by the spectrum manager or indirectly via commands to each of the modems. In a first embodiment of this method a training sequence is injected into the gap tones of each subscriber line by the interference module 934 of the spectrum manager (See FIG. 9) and the cross-talk on the gap tones of the remaining subscriber lines is monitored in process 1210 by the spectrum manager and used to calculate a matrix which quantifies for each tone on each subscriber line the noise level injected into each tone from each of the other subscriber lines. This is continued until all subscriber lines have performed as both interferor and interferee and the corresponding data accumulated by the spectrum manager. Based on this data an interference matrix is calculated the result of which is shown in FIG. 6A. The interference matrix shows for each sub-channel on each subscriber line the relative interference in terms of noise injected from all other subscriber lines. In an alternate embodiment of the invention the training in process 1208 is conducted in parallel on all lines at once by injecting the same training sequence combined with a subscriber line specific orthogonal key codes using code division multiplexing techniques (CDMA) into the gap tones of each subscriber line. The monitoring in process 1210 is done with a decoder using orthogonal key codes. The use of gap tones to conduct training avoids the need for reinitializing active subscriber lines and allows cross channel interference to be conducted during showtime operation of channels without any significant impact on the data rates of active lines while other lines or selected sub-channels thereof "wakes up". Next control passes to decision process 1214.

In decision process 1214 a determination is made as to whether the demand profiling phase of the spectrum manager's operation is provided for. If not control passes to process 1218. If the demand profiling phase is provided for control passes to process 1216. In process 1216 the demand module 936 of the spectrum manager (See FIG. 9) determines subscriber demand profiles which includes at least one of subscription bandwidth levels, guarantees, QOS, caps or usage patterns and demand profiles. These will be used in the allocation phase to determine on which subscriber lines additional sub-channels can be dropped and on which subscriber lines band plans can be revised. Subscriber demand profiles may be accumulated by the spectral manager directly by maintaining a rolling history of subscriber demand on each of the subscriber lines to which the spectrum manager is coupled or by access to subscription data maintained by the Telco or other subscriber line provider (See FIG. 11B) Demand profiles may include information such as the primary data flow direction, i.e. upstream or downstream and the excess capacity in each. Additionally demand profiles may include temporal information such as the time of day or night and the data rates in both the upstream and downstream direction. Control then passes to process 1218.

The spectral allocation phase commences with process 1218 in which depending on the capabilities of the spectrum manager either of four paths of operation will be provided. Generally all paths of operation allocate spectrum to each of the subscriber lines based at least on spectral profiling and where available the interference determination and demand phases of operation as well.

In processes 1232-1234 the spectrum manager determines in which sub-channels to drop tone bins, i.e. drop bit loading and downloads the corresponding target parameters to the associated modems, which then re-initialize the channels accordingly. In one embodiment of this path, the high frequency upstream or downstream sub-channels of long lines are designated to be dropped. In an alternate embodiment of the invention mid and low frequency sub-channels which exhibit bit loading levels below the threshold value may be designated to be dropped. Short lines may have selected low frequency sub-channels designated for dropping as well since they will be picking up additional bit loading capacity due to a reduction in interference in the high frequencies from the sub-channels dropped on the long lines. In another embodiment of the invention the data rates on a line are compared with the subscription level from the subscriber table (See FIG. 11B, Ref 1124) and any excess in data rates over the subscription level results in the spectrum manager setting target parameters which result in dropping of one or more tone bins to trim down the excess data rates on the subject subscriber line(s) until the actual data rate matches the subscription level. After all these determinations are made the new spectral profile target parameters are downloaded by the spectrum manager to the appropriate modules on the transmit path of the DSP and the effected channels are subject to another round of initialization. The parameters downloaded may include, revised gain tables, or tone loading for the effected subscriber lines and sub-channels thereof. Where interferors or demand have been determined in processes 1208-1210 and 1216 respectively the spectral allocation process may be enhanced by preferentially selecting tones for dropping based on the extent to which interference with other subscriber lines will be dropped or the impact on data rates vs. subscriber demand levels on the effected subscriber lines.

In an alternate embodiment of the invention the spectral allocation path executed by the spectrum manager includes processes 1228-1230. In processes 1228-1232 the spectrum manager determines in which sub-channels to vary the PSD masks and downloads the corresponding target parameters to the associated modems, which then re-initialize the channels accordingly. In an embodiment of this path of operation allocation is based both on dropping underutilized sub-channels, e.g. those which fall below a threshold value, on subscriber lines as well as generating new PSD masks with higher transmit power levels in the dropped sub-channels for those subscriber lines for which the higher transmit power levels will result in the least interference with other subscriber lines. This later determination results directly from the interference parameters determined during the interference determination phase and may rely on the bit dropping criteria discussed above in process 1232 or any demand information collected in process 1216. After all these determinations are made the new spectral profile target parameters are downloaded by the spectrum manager to the appropriate modules on the transmit path of the DSP and the effected channels are subject to another round of initialization. The parameters downloaded may include, revised PSD masks, gain tables, or tone loading for the effected subscriber lines and sub-channels thereof. Where demand has been determined in process 1216 the spectral allocation process may be enhanced by preferentially selecting tones or PSD masks based on the impact on data rates vs. subscriber demand levels on the effected subscriber lines.

In an alternate embodiment of the invention the spectral allocation path executed by the spectrum manager includes processes 1224-1226. In processes 1224-1226 the spectrum manager determines in which sub-channels to vary the PSD masks and band plans and then downloads the corresponding target parameters to the associated modems, which then re-initializes the channels accordingly. Allocation is based both on dropping underutilized sub-channels of each subscriber line based either on bit-loading or low demand profiles, generating new PSD masks with higher transmit power levels in the dropped sub-channels for the same or other subscriber lines in the bundle and revising the band plans for those subscriber lines with high demand profiles. Adding or dropping of bit loading on each tone of each channel may also rely on the bit dropping criteria discussed above in process 1232 or any demand information collected in process 1216. The selection of a subscriber line among the plurality of subscriber lines for band plan alterations is based on parameters provided by the demand module 936 (See FIG. 9). These include: the demand level requested by a subscriber, the temporal duration of the increased demand and the ability to meet the requested data rates and data rate directions, i.e. upstream or downstream, with the existing band plan. If a determination is made by the optimizer module 938 (See FIG. 9) that the existing band plan can not meet the requested demand then a determination is made as to whether there is excess capacity in either the upstream or downstream direction of the existing band plan. If there is overcapacity in one or the other of the upstream or downstream direction then a determination is made as to which sub-channels or sets of sub-channels should be targeted for a switch from an upstream to downstream direction or vice versa as required by the requested demand. In an alternate embodiment of the invention band plan alterations may be effected by adding additional sub-channels to meet the requested data rates. In either case, sub-channels are chosen by which minimize interference with other subscriber lines. A determination is then made as to whether with the selected sub-channels exhibit sufficiently low interference with other subscriber lines and their performance as to allow the band plan alteration. If all results are positive the band plan alterations are effected by the spectrum manager.

After all these determinations are made the new spectral profile target parameters are downloaded by the spectrum manager to the appropriate modules on the transmit path of the DSP and the effected channels are subject to another round of initialization. The parameters downloaded may include, revised band plans, PSD masks, gain tables, or tone loading for the effected subscriber lines and sub-channels thereof.

In still another embodiment of the invention the spectral allocation path executed by the spectrum manager includes processes 1220-1222. In processes 1220-1222 the spectrum manager determines in which sub-channels to vary the PSD masks, band plans and tunnel tones and downloads the corresponding target parameters to the associated modems, which then re-initialize the channels accordingly. Allocation is based both on dropping underutilized sub-channels of each subscriber line based either on bit-loading or low demand profiles, generating new PSD masks with higher transmit power levels in the dropped sub-channels for the same or other subscriber lines in the bundle adding tunnel tones where appropriate and revising the band plans for those subscriber lines with high demand profiles. After all these determinations are made the new spectral profile target parameters are downloaded by the spectrum manager to the appropriate modules on the transmit path of the DSP and the effected channels are subject to another round of initialization. The parameters downloaded may include: designated tunnel tones, revised band plans, PSD masks, gain tables, or tone loading for the effected subscriber lines and sub-channels thereof.

After re-initialization, a.k.a. spectral optimization, control is passed to process 1238 in which the showtime operation is continued or commenced. The processes discussed above may be carried out on initialization of the first and subsequent subscriber lines, as well as after all lines have been initialized and have entered showtime, to accommodate a new line or a line which has gone dormant and is subject to a "wake up." Previously active lines can remain in showtime while dormant lines are re-initialized. In decision process 1240 a determination is made as to whether a subscriber line is subject to wake up. If it is control returns to process 1202.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for optimizing channel capacity in multi-tone communications effected by opposing sets of modems coupled to one another by a plurality of subscriber lines, and the apparatus comprising:
    a spectrum manager coupled to at least one of the opposing sets of modems with the spectrum manager including:
        a profiler to obtain from the at least one of the opposing sets of modems the spectral characteristics of each of the plurality of subscriber lines;
        a demand module to determine for each of the plurality of subscriber lines the subscriber demand profile;
        an interference module to determine for each of the plurality of subscriber lines at least a relative interference from remaining ones of the plurality of subscriber lines by effecting training on gap tones located within at least one of: cross-over regions between and boundary regions proximate to the upstream and downstream spectral regions of the multi-tone communications effected on each of the plurality of subscriber lines; and
        an optimizer to define target parameters for at least one of bit loading, and power spectral density (PSD) for selected tones of the multi-tone communications based on the spectral characteristics from the profile module, the demand profiles from the demand module and the relative interference determined by the interference module and to download the target parameters to the at least one of the opposing sets of modems.

2. A method for optimizing channel capacity in multi-tone communications effected across a plurality of subscriber lines by opposing sets of modems coupled thereto, and the method comprising:
    obtaining the spectral characteristics of each of the plurality of subscriber lines from at least one of the opposing sets of modems;
    defining target parameters including at least one of bit loading and power spectral density (PSD) for each tone of the multi-tone communications effected by the opposing sets of modems based on the spectral characteristics obtained in the obtaining act; and
    identifying relatively long and short subscriber lines within the plurality of subscriber lines from the spectral characteristics obtained in the obtaining act; and
    setting target parameters which effect a reduction in at least one of bit loading and PSD for high frequency tones in the relatively long subscriber lines identified in the identifying act; and
    downloading to the at least one of the opposing sets of modems the target parameters defined in the defining act.

3. A method for optimizing channel capacity in multi-tone communications effected across a plurality of subscriber lines by opposing sets of modems coupled thereto, and the method comprising:
    obtaining the spectral characteristics of each of the plurality of subscriber lines from at least one of the opposing sets of modems;
    defining target parameters including at least one of bit loading and power spectral density (PSD) for each tone of the multi-tone communications effected by the opposing sets of modems based on the spectral characteristics obtained in the obtaining act; and further;
    identifying underutilized tones with bit loading below a threshold value within the plurality of subscriber lines from the spectral characteristics obtained in the obtaining act; and
    setting target parameters which effect a reduction in at least one of bit loading and PSD for the underutilized tones identified in the identifying act; and
    downloading to the at least one of the opposing sets of modems the target parameters defined in the defining act.

4. A method for optimizing channel capacity in multi-tone communications effected across a plurality of subscriber lines by opposing sets of modems coupled thereto, and the method comprising:
    obtaining the spectral characteristics of each of the plurality of subscriber lines from at least one of the opposing sets of modems;
    defining target parameters including at least one of bit loading and power spectral density (PSD) for each tone of the multi-tone communications effected by the opposing sets of modems based on the spectral characteristics obtained in the obtaining act; and further;

identifying underutilized tones with bit loading below a threshold value within the plurality of subscriber lines from the spectral characteristics obtained in the obtaining act;

quantifying interference on each tone for each of the plurality of subscriber lines from remaining ones of the plurality of subscriber lines;

determining which subscriber lines among the plurality of subscriber lines exhibit data rates exceeding a corresponding subscriber demand level; and setting target parameters which effect a reduction in at least one of bit loading and PSD for selected ones of the underutilized tones identified in the identifying act in which data rates exceed the corresponding subscriber demand level as determined in the determining act; and downloading to the at least one of the opposing sets of modems the target parameters defined in the defining act.

5. A method for optimizing channel capacity in multi-tone communications effected across a plurality of subscriber lines by opposing sets of modems coupled thereto, and the method comprising:

obtaining the spectral characteristics of each of the plurality of subscriber lines from at least one of the opposing sets of modems;

defining target parameters including at least one of bit loading and power spectral density (PSD) for each tone of the multi-tone communications effected by the opposing sets of modems based on the spectral characteristics obtained in the obtaining act;

downloading to the at least one of the opposing sets of modems the target parameters defined in the defining act; and further comprising at least one of the acts of:

quantifying interference on each tone for each of the plurality of subscriber lines from remaining ones of the plurality of subscriber lines;

determining which subscriber lines among the plurality of subscriber lines exhibit data rates exceeding a corresponding subscriber demand level; and wherein the defining act further comprises defining the target parameters based on the spectral characteristics obtained in the obtaining act and at least one of the interference determined in the quantifying act and or the data rates determined in the determining act.

6. A means for optimizing channel capacity in multi-tone communications effected across a plurality of subscriber lines by opposing sets of modems coupled thereto, and the means comprising:

means for obtaining the spectral characteristics of each of the plurality of subscriber lines from at least one of the opposing sets of modems;

means for defining target parameters including at least one of bit loading and power spectral density (PSD) for each tone of the multi-tone communications effected by the opposing sets of modems based on the spectral characteristics obtained by the means for obtaining; and wherein the means for defining further includes;

means for identifying relatively long and short subscriber lines within the plurality of subscriber lines from the spectral characteristics obtained by the means for obtaining; and means for setting target parameters which effect a reduction in at least one of bit loading and PSD for high frequency tones in the relatively long subscriber lines identified by the means for identifying; and means for downloading to the at least one of the opposing sets of modems the target parameters defined by the means for defining.

7. A means for optimizing channel capacity in multi-tone communications effected across a plurality of subscriber lines by opposing sets of modems coupled thereto, and the means comprising:

means for obtaining the spectral characteristics of each of the plurality of subscriber lines from at least one of the opposing sets of modems;

means for defining target parameters including at least one of bit loading and power spectral density (PSD) for each tone of the multi-tone communications effected by the opposing sets of modems based on the spectral characteristics obtained by the means for obtaining; and wherein the means for defining further includes;

means for identifying underutilized tones with bit loading below a threshold value within the plurality of subscriber lines from the spectral characteristics obtained by the means for obtaining; and means for setting target parameters which effect a reduction in at least one of bit loading and PSD for the underutilized tones identified by the means for identifying; and means for downloading to the at least one of the opposing sets of modems the target parameters defined by the means for defining.

* * * * *